US010988584B2

(12) United States Patent
Someya et al.

(10) Patent No.: US 10,988,584 B2
(45) Date of Patent: Apr. 27, 2021

(54) RESIN FOR FOAM MOLDING, FOAM MOLDED ARTICLE, AND METHOD FOR PRODUCING SAME

(71) Applicant: KYORAKU CO., LTD., Kyoto (JP)

(72) Inventors: Takaaki Someya, Kanagawa (JP); Takeru Sano, Kanagawa (JP); Yoshinori Ono, Kanagawa (JP); Tadatoshi Tanji, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 148 days.

(21) Appl. No.: 16/345,045

(22) PCT Filed: Oct. 27, 2017

(86) PCT No.: PCT/JP2017/038850
§ 371 (c)(1),
(2) Date: Apr. 25, 2019

(87) PCT Pub. No.: WO2018/079699
PCT Pub. Date: May 3, 2018

(65) Prior Publication Data
US 2019/0276615 A1 Sep. 12, 2019

(30) Foreign Application Priority Data

Oct. 31, 2016 (JP) .............................. JP2016-213286
Nov. 21, 2016 (JP) .............................. JP2016-226264
Feb. 27, 2017 (JP) .............................. JP2017-034527

(51) Int. Cl.
| | | |
|---|---|---|
| C08L 23/12 | (2006.01) |
| C08J 5/04 | (2006.01) |
| C08K 5/14 | (2006.01) |
| C08K 7/02 | (2006.01) |
| B29C 44/00 | (2006.01) |
| C08J 9/12 | (2006.01) |
| C08J 9/04 | (2006.01) |
| B29C 49/00 | (2006.01) |

(52) U.S. Cl.
CPC ............... *C08J 5/042* (2013.01); *B29C 44/00* (2013.01); *B29C 49/00* (2013.01); *C08J 5/043* (2013.01); *C08J 9/04* (2013.01); *C08J 9/12* (2013.01); *C08K 5/14* (2013.01); *C08K 7/02* (2013.01); *C08L 23/12* (2013.01); *C08J 2201/03* (2013.01); *C08J 2323/12* (2013.01); *C08L 2203/14* (2013.01)

(58) Field of Classification Search
CPC ... C08L 23/12; C08J 5/04; C08K 5/14; C08K 7/02
USPC ......................................................... 524/495
See application file for complete search history.

(56) References Cited

U.S. PATENT DOCUMENTS

| | | | |
|---|---|---|---|
| 4,751,250 | A | 6/1988 | White et al. |
| 4,940,629 | A | 7/1990 | Weber et al. |
| 5,786,403 | A | 7/1998 | Okada et al. |
| 2010/0152360 | A1 | 6/2010 | Jiang et al. |
| 2011/0048571 | A1 | 3/2011 | Onodera et al. |
| 2013/0323448 | A1 | 12/2013 | Onodera et al. |
| 2015/0045467 | A1 | 2/2015 | Sano et al. |
| 2016/0082621 | A1* | 3/2016 | Li ............................ B65D 3/12 156/229 |

FOREIGN PATENT DOCUMENTS

| | | |
|---|---|---|
| JP | S62267337 A | 11/1987 |
| JP | H02124947 A | 5/1990 |
| JP | H06-008313 A | 1/1994 |
| JP | H09-296063 A | 11/1997 |
| JP | H11-286040 A | 10/1999 |
| JP | 2006-341427 A | 12/2006 |
| JP | 2009-241528 A | 10/2009 |
| JP | 2010-150509 A | 7/2010 |
| JP | 2013-010890 A | 1/2013 |
| JP | 2013064128 A | 4/2013 |
| JP | 2013185044 A | 9/2013 |
| JP | 2014-505143 A | 2/2014 |
| KR | 10-0764611 B1 | 10/2007 |
| WO | 2013/111692 A1 | 8/2013 |

OTHER PUBLICATIONS

International Search Report dated Jan. 23, 2018 filed in PCT/JP2017/038850.
Office Action dated Mar. 10, 2020, in corresponding Korean Application No. 10-2019-7013063; 18 pages.
Japanese Office Action dated Dec. 1, 2020, in connection with corresponding JP Application No. 2016-213286 (6 pp., including machine-generated English translation).
The partial supplementary European Search Report dated May 28, 2020, in corresponding European patent application No. 17864418.3, 12 pages.
Office Action dated Jun. 30, 2020, in corresponding Japanese Application No. 2016-226264, 8 pages.

* cited by examiner

*Primary Examiner* — Deve V Hall
(74) *Attorney, Agent, or Firm* — Maier & Maier, PLLC

(57) ABSTRACT

Provided is a resin for foam molding excellent in foam molding property and low-temperature impact resistance. According to the present invention, provided is a resin for foam molding including a component A, a component B and a component C. The component A is a long-chain branched homopolypropylene, the component B is a long-chain branched block polypropylene, the component C is a polyethylene-based elastomer, and when a total of the components A to C is 100 parts by mass, content of the component A is 20 to 70 parts by mass, content of the component B is 20 to 70 parts by mass, and content of the component C is 1 to 20 parts by mass.

5 Claims, 12 Drawing Sheets

- ◆ SERIES A WB140 (COMPONENT B IN COMBINATION)
- ■ SERIES B WB140 (LINEAR BLOCK PP IN COMBINATION)
- △ SERIES C SLB047N (COMPONENT B IN COMBINATION)
- × SERIES D SLB047N (LINEAR BLOCK PP IN COMBINATION)

(a)

(b) A—A CROSS-SECTIONAL VIEW (a)

(b)
A-A CROSS-SECTIONAL VIEW (a)

(b)
A—A CROSS-SECTIONAL VIEW (a)

(b)
A–A CROSS-SECTIONAL VIEW

RESIN FOR FOAM MOLDING, FOAM MOLDED ARTICLE, AND METHOD FOR PRODUCING SAME

CROSS REFERENCE TO RELATED APPLICATIONS

This is a U.S. National Phase Application under 35 U.S.C. § 371 of International Patent Application No. PCT/JP2017/038850, filed Oct. 27, 2017, which claims priority of Japanese Patent Application No. 2016-213286, filed Oct. 31, 2016, Japanese Patent Application No. 2016-226264, filed Nov. 21, 2016 and Japanese Patent Application No. 2017-034527, filed Feb. 27, 2017. The entire contents of which are hereby incorporated by reference.

TECHNICAL FIELD

The present invention relates to a resin for foam molding, a foam molded article, and a method for producing the same.

BACKGROUND

As foamed blow molded articles, for example, various climate control ducts mounted in an instrument panel of an automobile are known. For the climate control ducts, a foam duct obtained by molding a foamed resin material is widely used. The foam duct is lightweight. It is possible to easily produce the foam duct, for example, by melt-kneading a polyolefin-based resin containing an added foaming agent, and blow-molding a foamed parison extruded from a die of an extruder.

The polyolefin-based resin is widely used as the resin material used for the foamed blow molded article. Among them, polypropylene-based resins are generally used WO 2013/111692.

WO 2013/111692 discloses that a foaming agent is added to a mixed resin obtained by mixing a foaming main material containing a propylene homopolymer, a diluent containing block polypropylene, and a modifying material containing a polyethylene-based elastomer. And, a blow-molded automobile duct is disclosed.

SUMMARY

By the way, the present inventors examined in detail foam molding property of the mixed resin disclosed in WO 2013/111692. As a result, when content of the foaming main material in the mixed resin is 80 parts by mass or more, it has been found that the foam molding property is good. On the other hand, when the content of the foaming main material is less than 80 parts by mass, it has been found that the foam molding property is rapidly impaired with reduction of the content of the foaming main material.

On the other hand, it has been found that when the content of the foaming main material in the mixed resin is too large, since low-temperature impact resistance is reduced, there is a possibility that the duct may be damaged at the time of transportation or the like.

The present invention has been made in view of such circumstances. According to the present invention, the resin for foam molding excellent in foam molding property and low-temperature impact resistance is provided.

According to the present invention, provided is a resin for foam molding, including a component A, a component B and a component C. The component A is a long-chain branched homopolypropylene, the component B is a long-chain branched block polypropylene, the component C is a polyethylene-based elastomer, and when a total of the components A to C is 100 parts by mass, content of the component A is 20 to 70 parts by mass, content of the component B is 20 to 70 parts by mass, and content of the component C is 1 to 20 parts by mass.

The present inventors conducted extensive studies. Then, it has been found that the foam molding property and the low-temperature impact resistance can be improved by blending the components A to C in a specific ratio. Thus, the present invention has been completed.

Hereinafter, various embodiments of the present invention are exemplified. The embodiments described below can be combined with one another.

Preferably, when the total of the components A to C is 100 parts by mass, the content of the component A is 40 to 50 parts by mass. The content of the component B is 40 to 60 parts by mass. The content of the component C is 5 to 10 parts by mass.

Preferably, the long-chain branched homopolypropylene is a peroxide-modified long-chain branched homopolypropylene, and the long-chain branched block polypropylene is a polymerized long-chain branched block polypropylene.

According to another aspect of the present invention, there is provided a method for producing a foam molded article. This method includes a step of obtaining a foamed resin by melt-kneading the above-described resin for foam molding and a foaming agent in a foam extruder, forming a foamed parison by extruding the foamed resin from the foam extruder, and obtaining the foam molded article by molding the foamed parison.

According to still another aspect of the present invention, there is provided a foam molded article formed by using the above-described resin for foam molding. Ball drop fracture height when a ball of 500 g is dropped at an environmental temperature of −10° C. on the foam molded article is 40 cm or more.

BRIEF DESCRIPTION OF THE DRAWINGS

FIG. 8(a) is a vertical cross-section passing through a center of a parison 23. FIG. 8(b) is a cross-sectional view taken along a line A-A in FIG. 8(a). FIG. 8(c) is a bottom view. In FIG. 8(c), a pinch portion 29 is shown by a dotted line for convenience of illustration.

FIG. 9(a) is the vertical cross-section passing through the center of the parison 23. FIG. 9(b) is a cross-sectional view taken along a line A-A in FIG. 9(a).

FIG. 10(a) is the vertical cross-section passing through the center of the parison 23. FIG. 10(b) is a cross-sectional view taken along a line A-A in FIG. 10(a).

FIG. 11(a) is the vertical cross-section passing through the center of the parison 23. FIG. 11(b) is a cross-sectional view taken along a line A-A in FIG. 11(a).

FIG. 12(a) is the vertical cross-section passing through the center of the parison 23. FIG. 12(b) is a cross-sectional view taken along a line A-A in FIG. 12(a).

FIG. 13(a) shows a state before cutting. FIG. 13(b) shows a state immediately after start of the cutting. FIG. 13(c) shows a state after the cutting has progressed.

DETAILED DESCRIPTION

Figure 1:
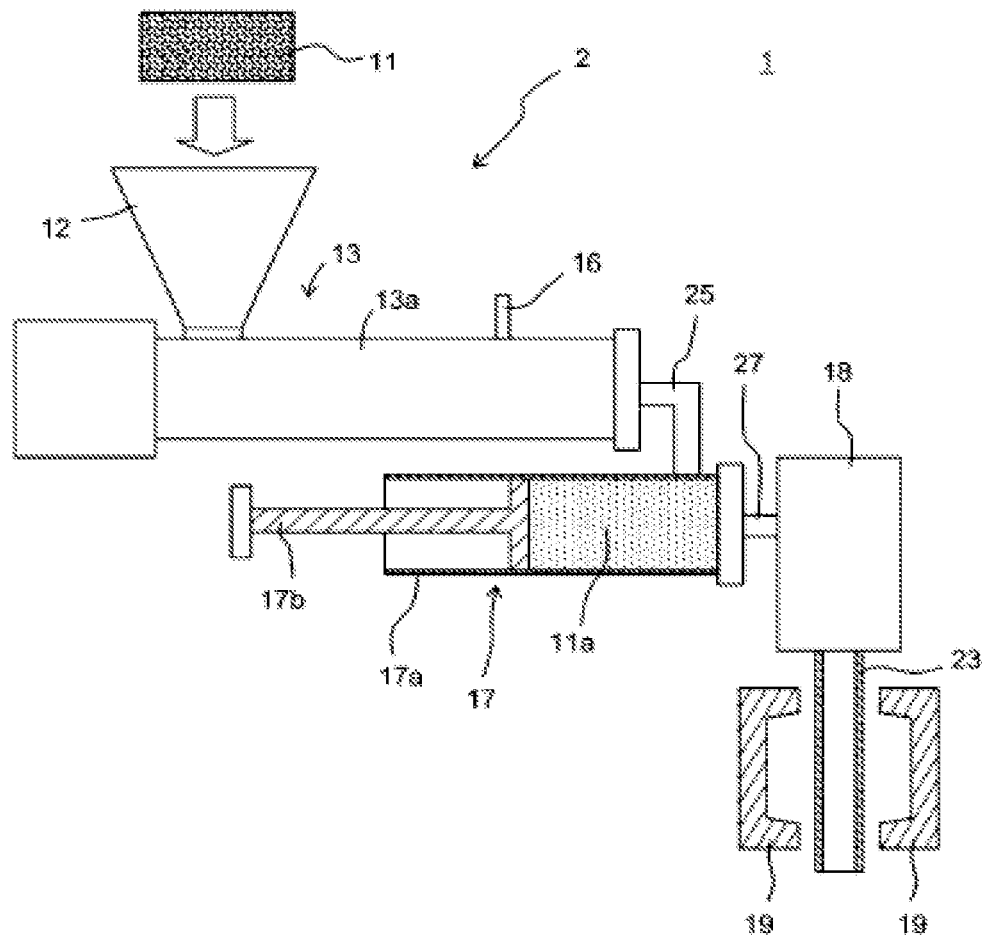
FIG. 1 shows an example of a foam molding machine 1 which can be used in a method for producing a foam molded article according to an embodiment of the present invention.

Hereinafter, embodiments of the present invention will be described. Various features shown in the embodiments described below can be combined with one another. Further, the invention is realized independently for each feature.

First Embodiment

1. Resin for Foam Molding

A resin for foam molding of an embodiment of the present invention contains a component A, a component B, and a component C. Each component will be described in detail below. In the following description, polypropylene is described as PP, polyethylene as PE, and ethylene-propylene rubber as EPR.

<Component A: Long-Chain Branched Homo-PP>

The component A is a long-chain branched homo-PP. The long-chain branched homo-PP is a homo-PP having a long-chain branched structure. The long-chain branched homo-PP has a feature of excellent in foam molding property, but low in low-temperature impact resistance. The long-chain branched homo-PP preferably has a weight average branching index g of 0.9 or less.

The long-chain branched homo-PP preferably has an MT (a melt tension) of 100 to 500 mN, specifically for example, 100, 150, 200, 250, 300, 350, 400, 450, or 500 mN. The MT of the long-chain branched homo-PP may be in a range between any two of numerical values exemplified here.

The long-chain branched homo-PP preferably has an MFR (a melt flow rate) of 0.5 to 7 (g/10 min), specifically for example, 0.5, 1, 2, 3, 4, 5, 6 or 7 (g/10 min). The MFR of the long-chain branched homo-PP may be in a range between any two of the numerical values exemplified here.

The long-chain branched homo-PP is preferably PP formed by peroxide modification (that is, peroxide-modified long-chain branched homo-PP). The peroxide modification means that a long-chain branch is formed by melt-extruding a mixture of linear homo-PP and peroxide by a twin-screw kneader.

When a total of the components A to C is 100 parts by mass, content of the component A is 20 to 70 parts by mass, preferably 40 to 50 parts by mass, specifically 20, 25, 30, 35, 40, 45, 50, 55, 60, 65, or 70 parts by mass. The content of the component A may be in a range between any two of the numerical values exemplified here. If an amount of the component A is too small, the foam molding property is insufficient. If the amount of the component A is too large, the low-temperature impact resistance is insufficient.

<Component B: Long-Chain Branched Block PP>

The component B is a long-chain branched block PP. The long-chain branched block PP is a block PP having a long-chain branched structure. The long-chain branched block PP usually contains a rubber component. The long-chain branched block PP has a feature of poor in foam molding property, but high low-temperature impact resistance as compared to the long-chain branched homo-PP. The block PP is a block copolymer containing PE blocks and EPR blocks dispersed in a homo-PP block.

In WO 2013/111692, a foamed resin containing the long-chain branched homo-PP and linear block PP is used. In such a blending, when a ratio of the linear block PP is increased, the low-temperature impact resistance is improved, however, there is a problem that the foam molding property is rapidly reduced. On the other hand, degree of reduction in the foam molding property of the long-chain branched block PP used in the present embodiment is smaller than that of the linear block PP. Therefore, it is possible to improve the low-temperature impact resistance while suppressing reduction in the foam molding property by adding the long-chain branched block PP.

The long-chain branched block PP preferably has a weight average branching index g of 0.9 or less.

The long-chain branched block PP preferably has the MT (melt tension) of 50 to 500 mN, specifically for example, 50, 100, 150, 200, 250, 300, 350, 400, 450, or 500 mN. The MT of the long-chain branched block PP may be in a range between any two of the numerical values exemplified here.

The long-chain branched block PP preferably has an MFR (a melt flow rate) of 1 to 7 (g/10 min), specifically for example, 1, 2, 3, 4, 5, 6 or 7 (g/10 min). The MFR of the long-chain branched block PP may be in a range between any two of the numerical values exemplified here.

The long-chain branched block PP is preferably PP produced by polymerizing the homo-PP produced by macromer copolymerization and ethylene (that is, polymerized long-chain branched block PP). The macromer copolymerization includes a first reaction (formation of propylene macromer (substance obtained by reacting a plurality of propylenes) by polymerization of propylene monomers) and a second reaction (polymerization of propylene monomers and propylene macromers). In the second reaction, the propylene monomers react with each other in a straight-chain form. The propylene macromer reacts with a side of the straight-chain to form the long-chain branch. By polymerizing the homo-PP obtained by the macromer copolymerization with ethylene, a part of the PP and ethylene are polymerized to form EPR. Therefore, the long-chain branched block PP has a higher low-temperature impact resistance than the peroxide-modified long-chain branched homo-PP. Further, no peroxide is used. Therefore, changes in MFR and MT at the time of recycling are smaller than those in the peroxide-modified long-chain branched homo-PP.

When the total of the components A to C is 100 parts by mass, the content of the component B is 20 to 70 parts by mass, preferably 40 to 60 parts by mass, specifically 20, 25, 30, 35, 40, 45, 50, 55, 60, 65, or 70 parts by mass. The content of component B may be in a range between any two of the numerical values exemplified here. If an amount of the component B is too small, the low-temperature impact resistance is insufficient. If the amount of the component B is too large, the foam molding property is insufficient.

<Component C: PE-Based Elastomer>

The component C is a PE-based elastomer. The PE-based elastomer is obtained by finely dispersing an olefin-based rubber in a matrix of PE-based resin. The PE-based elastomer has an excellent compatibility with PP-based resin. Therefore, the PE-based elastomer has a feature that it can impart rubber elasticity to a resin material to improve impact resistance. The impact resistance is improved by using the PE-based elastomer in addition to the PP-based resin. Thus, the foam molding property and the impact resistance are both satisfied.

The PE-based elastomer preferably has the MT of 10 to 100 mN, specifically for example, 10, 20, 30, 40, 50, 60, 70, 80, 90, or 100 mN. The MT of the PE-based elastomer may be in a range between any two of the numerical values exemplified here.

The PE-based elastomer preferably has the MFR of 0.1 to 5 (g/10 min), specifically for example, 0.1, 0.5, 1, 2, 3, 4 or 5 (g/10 min). The MFR of the PE-based elastomer may be in a range between any two of the numerical values exemplified here.

When the total of components A to C is 100 parts by mass, the content of component C is 1 to 20 parts by mass, preferably 5 to 10 parts by mass, specifically for example, 1, 2, 3, 4, 5 6, 7, 8, 9, 10, 11, 12, 13, 14, 15, 16, 17, 18, 19 or 20 parts by mass. The content of the component C may be in a range between any two of the numerical values exemplified here. When the content of the component C is 5 parts by mass or more, it is possible to obtain a particularly remarkable improvement effect in the impact resistance. The greater a ratio of the PE-based elastomer, the more advantageous for improving the impact resistance. However, if the ratio of the PE-based elastomer is too large, a ratio of the PP-based resin is relatively reduced. Therefore, it is difficult to maintain excellent physical properties such as the foam molding property possessed by the PP-based resin. From such a viewpoint, the ratio of the PE-based elastomer is preferably 10% by mass or less. That is, the ratio of the PE-based elastomer is preferably 5 to 10% by mass.

2. Method for Producing Foam Molded Article

A method for producing a foam molded article of the embodiment of the present invention includes the following step. In this step, the above-described resin for foam molding and a foaming agent are melt-kneaded in a foam extruder. Then, a foamed parison is formed by extruding the obtained foamed resin from the foam extruder. The foam molded article is obtained by molding the foamed parison.

The method of the present embodiment can be implemented, for example, using a molding machine (foam molding machine) 1 exemplified in FIG. 1. The foam molding machine 1 includes a resin supply device 2, a head 18, and split mold blocks 19. The resin supply device 2 includes a hopper 12, an extruder 13, an injector 16, and an accumulator 17. The extruder 13 and the accumulator 17 are connected through a connecting pipe 25. The accumulator 17 and the head 18 are connected through a connecting pipe 27.

Each component will be described in detail below.

<Hopper 12, Extruder 13>

The hopper 12 is used to introduce a raw material resin 11 into a cylinder 13a of the extruder 13. A form of the raw material resin 11 is not particularly limited. The raw material resin 11 is usually pellet-like. The raw material resin is the resin for foam molding described above. When molding is performed using only a virgin resin, a modifying material is added to the above-described resin for foam molding as required. When a recovered resin material is used, a predetermined ratio of the virgin resin is added to the pulverized recovered resin material. The virgin resin can be added to have a mass ratio of, for example, 10 to 30% in the raw material resin 11.

The raw material resin 11 is introduced into the cylinder 13a from the hopper 12. Thereafter, the raw material resin 11 is melted by heating in the cylinder 13a to form a molten resin. Further, the molten resin is conveyed toward a tip of the cylinder 13a by rotation of a screw disposed in the cylinder 13a. The screw is disposed in the cylinder 13a and conveys the molten resin being kneaded by its rotation. A gear device is provided at a base end of the screw. The screw is rotationally driven by the gear device. The number of screws disposed in the cylinder 13a may be one, two or more.

<Injector 16>

The cylinder 13a is provided with an injector 16 for injecting the foaming agent into the cylinder 13a. The foaming agents injected from the injector 16 include the physical foaming agents, the chemical foaming agents, and mixtures thereof. The physical foaming agents are preferable. The physical foaming agents which can be used include inorganic physical foaming agents such as air, carbon dioxide gas, nitrogen gas and water, organic physical foaming agents such as butane, pentane, hexane, dichloromethane, dichloroethane, and supercritical fluid thereof. Among them, air, carbon dioxide gas or nitrogen gas is preferably used as the foaming agent. It is possible to prevent mixing of organic substances by using them. As a result, it is possible to suppress reduction in durability and the like. It is possible to foam uniformly and reliably by using the supercritical fluid. The supercritical fluid is preferably prepared using carbon dioxide, nitrogen or the like. In the case of nitrogen, the supercritical fluid is obtained at a critical temperature of 149.1° C. and a critical pressure of 3.4 MPa or more. In the case of carbon dioxide, the supercritical fluid is obtained at a critical temperature of 31° C. and a critical pressure of 7.4 MPa or more. The chemical foaming agents include chemical foaming agents that generate carbon dioxide gas through the chemical reaction of the acid (example: citric acid or salt thereof) and the base (example: sodium bicarbonate). The chemical foaming agent may be introduced from the hopper 12 instead of being injected from the injector 16.

<Accumulator 17, Head 18>

The foamed resin containing the raw material resin and the foaming agent being melt-kneaded is extruded from a resin extrusion port of the cylinder 13a. The foamed resin is injected into the accumulator 17 through the connecting pipe 25. The accumulator 17 includes a cylinder 17a, and a piston 17b slidable therein. The foamed resin can be stored in the cylinder 17a. After the foamed resin is stored by a predetermined amount in the cylinder 17a, the piston 17b moves. Thus, the foamed resin is extruded from a slit provided in the head 18 through the connecting pipe 27 and suspended to form a foamed parison 23. A shape of the foamed parison 23 is not particularly limited. The shape may be cylindrical or sheet-like. An extrusion rate of the foamed parison 23 is, for example, 700 kg/hour or more. The accumulator 17 can also be built in the head 18. The accumulator 17 may include the piston 17b which is pushed down in a vertical direction.

<Split Mold Block 19>

The foamed parison 23 is introduced between a pair of split mold blocks 19. The foam molded article is obtained by molding the foamed parison 23 using the split mold blocks 19. A molding method using the split mold blocks 19 is not particularly limited. Blow molding may be performed including molding with air blown into a cavity of the split mold blocks 19. Vacuum molding may be performed including molding the foamed parison 23 by reducing a pressure in the cavity from an inner surface of the cavity of the split mold blocks 19. A combination of the blow molding and the vacuum molding may be performed. In the case of blow molding, the air is blown therein at a pressure range of, for example, 0.05 to 0.15 MPa.

After molding, a portion other than a finished product contained in the resin material which has been cooled and solidified is pulverized to be the recovered resin material. The recovered resin material can again be used for producing the foam molded article.

3. Foam Molded Article

Figure 2:
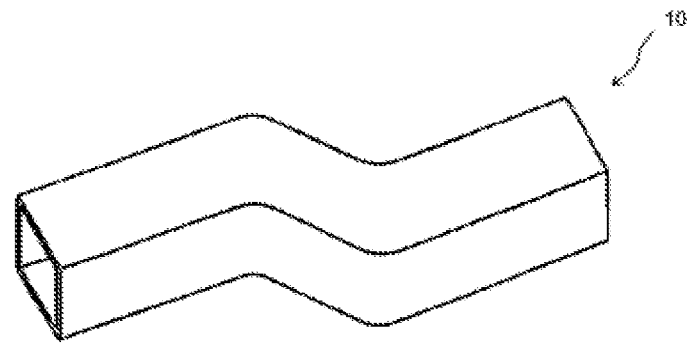
FIG. 2 is a perspective view showing a foam duct 10 which is an example of the foam molded article.

An example of the foam molded article is a foam duct 10 as shown in FIG. 2. The foam duct 10 is configured such that conditioned air supplied from an air conditioning unit (not shown) flows through an internal channel to ventilate a desired portion. A shape of the foam duct 10 is not limited to a shape shown by FIG. 2. The shape may be any shape depending on application, installation place or the like.

The foam duct 10 of the present embodiment is obtained by sandwiching the foamed parison formed by extruding the foamed resin from a die of the extruder with the mold blocks to perform the blow molding. Both ends of the duct immediately after the blow molding are in a closed state. The both ends are cut by trimming after the blow molding. In this way, the both ends are formed in an opening shape.

The foam duct 10 of the present embodiment is formed of a hollow foamed resin molded article including a tube wall constituted by a foam layer. The foam layer is configured to have a closed cell structure. Thus, it is possible to obtain a lightweight and highly heat-insulating duct. The closed cell structure is a structure having a plurality of independent foamed cells. The closed cell structure means a closed cell content of at least 70% or more. With such a configuration, even when the air for cooling flows through the foam duct 10, possibility of occurrence of condensation can be almost eliminated.

As described above, the foam duct 10 of the present embodiment is formed using a mixed resin containing the components A to C in a specific ratio. Therefore, it is possible to satisfy both the foam molding property and the impact resistance. For example, it is possible to mold the foam duct having an expansion ratio of 2.5 times (2 to 3 times) and an average thickness of 2 mm (1.5 to 2.5 mm).

1. Production of Foam Duct

The foam duct 10 was produced using the foam molding machine 1 shown in FIG. 1. An inside diameter of the cylinder 13a of the extruder 13 was 50 mm, and its L/D=34. The raw material resin used contained the components A to C and the linear block PP shown in Table 1 in a blending ratio (parts by mass) shown in Table 1. Further, 1.0 parts by mass of LDPE-based master batch (produced by Dainichiseika Color & Chemicals Mfg. Co., Ltd., trade name "Finecell Master P0217K") containing 20 wt % of sodium hydrogencarbonate-based foaming agent as a nucleating agent was added to 100 parts by mass of the resin. Furthermore, 1.0 parts by mass of LLDPE-based master batch containing 40 wt % of carbon black as a colorant was added. A temperature of each portion was controlled so that a temperature of the foamed parison 23 was 190 to 200° C. The number of revolutions of the screw was 60 rpm. An extrusion amount was 20 kg/hr. $N_2$ gas was used as the foaming agent. The $N_2$ gas was injected through the injector 16. An amount of injection was 0.4 [wt %] (($N_2$ injection amount)/(resin extrusion amount)). The head 18 was controlled so that the foamed parison 23 had a thickness of 2 mm.

The foamed parison 23 formed under the above conditions was disposed between the split mold blocks 19. Thereafter, the split mold blocks 19 were clamped. Thus, the foam duct 10 was obtained.

2. Evaluation

An expansion ratio retention rate and the low-temperature impact resistance of the produced foam duct were evaluated by the following methods.

<Expansion Ratio Retention Rate>

The expansion ratio retention rate was calculated based on the following equation. The expansion ratio in Comparative Example 1 was used as a reference. This is because the ratio of WB140 which is a resin excellent in foam molding property is 100% in Comparative Example 1. When the expansion ratio retention rate was 90% or more, it was evaluated as "Good". When the expansion ratio retention rate was less than 90%, it was evaluated as "Poor".

Expansion ratio retention rate [%]={(expansion ratio in each Example, Comparative Example)/(expansion ratio in Comparative Example 1)}×100   (Formula 1)

<Low-Temperature Impact Resistance>

A test of the low-temperature impact resistance was performed by dropping a ball of 500 g at an environmental temperature of −10° C. on the foam duct 10. When ball drop fracture height was less than 40 cm, it was evaluated as "Poor". When the ball drop fracture height was 40 cm or more, it was evaluated as "Good".

TABLE 1

|  |  | Component A Long-chain branched homo-PP | Component B Long-chain branched block | Component C | Linear block PP | Expansion | Expansion ratio retention |  |
|---|---|---|---|---|---|---|---|---|
|  |  | WB1 40 | SLB047N | PP EX6000 | TPE DF605 | BC4BS W | ratio [—] | rate [%] | Low-temperature impact resistance |
| Example | 1 | 70 |  | 20 | 10 | 4 |  | 100 | Good |
|  | 2 | 70 |  | 25 | 5 | 4 |  | 100 | Good |
|  | 3 | 40 |  | 50 | 10 | 4 |  | 100 | Good |
|  | 4 | 40 |  | 55 | 5 | 4 |  | 100 | Good |
|  | 5 | 30 |  | 60 | 10 | 4 |  | 100 | Good |
|  | 6 | 30 |  | 65 | 5 | 4 |  | 100 | Good |

TABLE 1-continued

|  |  | Component A Long-chain branched homo-PP WB140 | Component A Long-chain branched homo-PP SLB047N | Component B Long-chain branched block PP EX6000 | Component C TPE DF605 | Linear block PP BC4BSW | Expansion ratio [—] | Expansion ratio retention rate [%] | Low-temperature impact resistance |
|---|---|---|---|---|---|---|---|---|---|
| | 7 | | 70 | 20 | 10 | | 3.2 | 100 | Good |
| | 8 | | 70 | 25 | 5 | | 3.2 | 100 | Good |
| | 9 | | 40 | 50 | 10 | | 3 | 94 | Good |
| | 10 | | 40 | 55 | 5 | | 3 | 94 | Good |
| Comparative Example | 1 | 100 | | | | | 4 | 100 | Poor |
| | 2 | 80 | | 10 | 10 | | 4 | 100 | Poor |
| | 3 | 70 | | 30 | | | 4 | 100 | Poor |
| | 4 | 30 | | 70 | | | 4 | 100 | Poor |
| | 5 | 10 | | 80 | 10 | | 2 | 50 | Good |
| | 6 | 10 | | 90 | | | 2 | 50 | Good |
| | 7 | | | 100 | | | 1.8 | — | Good |
| | 8 | 80 | | | 10 | 10 | 4 | 100 | Poor |
| | 9 | 60 | | | 10 | 30 | 3.2 | 80 | Good |
| | 10 | | | | | 100 | 1.3 | — | Good |
| | 11 | | 100 | | | | 3.2 | 100 | Poor |
| | 12 | | 80 | 10 | 10 | | 3.2 | 100 | Poor |
| | 13 | | 70 | 30 | | | 3.2 | 100 | Poor |
| | 14 | | 40 | 60 | | | 3.2 | 100 | Poor |
| | 15 | | 10 | 80 | 10 | | 2 | 63 | Good |
| | 16 | | 80 | | 10 | 10 | 2 | 63 | Poor |
| | 17 | | 70 | | 10 | 20 | 2 | 63 | Good |

Details of each component in Table 1 are as follows.
Long-chain branched homo-PP: produced by Borealis AG., trade name: WB140 (long-chain branched structure is introduced by peroxide modification, MT is 239.4 mN, MFR is 1.62 g/10 min)
Long-chain branched homo-PP: produced by Kaneka Corporation, trade name: SLB047N (long-chain branched structure is introduced by peroxide modification, MT is 200 mN, MFR is 1.2 g/10 min)
Long-chain branched block PP: produced by Japan Polypropylene Corporation, trade name: EX6000 (long-chain branched structure is introduced during polymerization, MT is 144.4 mN, MFR is 2.12 g/10 min)
PE-based elastomer (TPE): produced by Mitsui Chemicals, Inc., trade name: DF605 (MT is 31.6 mN, MFR is 0.47 g/10 min)
Linear block PP: produced by Japan Polypropylene Corporation, trade name: BC4BSW (MT is 5.4 mN, MFR is 4.7 g/10 min)

The MT of the long-chain branched homo-PP, the long-chain branched block PP, and the linear block PP shows a tensile force obtained when a strand extruded from an orifice having a diameter of 2.095 mm and a length of 8 mm at a residual heat temperature of 230° C. and an extrusion rate of 5.7 mm/min is wound on a roller having a diameter of 50 mm at a winding speed of 100 rpm by using a melt tension tester (manufactured by Toyo Seiki Seisaku-sho, Ltd.). The MT of the PE-based elastomer is a value obtained at a residual heat temperature of 210° C.

The MFR of the long-chain branched homo-PP, the long-chain branched block PP, and the straight chain block PP is a value measured at a test temperature of 230° C. and a test load of 2.16 kg according to JIS K-7210. The MFR of the PE-based elastomer is a value measured at a test temperature of 190° C. and a test load of 2.16 kg according to JIS K-6922-1.

3. Consideration

In all Examples, when the total of the components A to C is 100 parts by mass, the content of component A is 20 to 70 parts by mass. The content of the component B is 20 to 70 parts by mass. The content of the component C is 1 to 20 parts by mass. Therefore, the expansion ratio retention rate and the low-temperature impact resistance were good.

Comparative Examples 1, 3, 4, 11, 13, and 14 do not contain the component C. Therefore, the low-temperature impact resistance was low.

In Comparative Examples 2 and 12, the content of the component B is too small. Therefore, the low-temperature impact resistance was low.

In Comparative Examples 5 to 7 and 15, the content of component A is too small. Therefore, the expansion ratio retention rate was low.

Comparative Examples 8 and 16 contain the linear block PP instead of the component B. However, since the ratio was too small, the low-temperature impact resistance was low.

In Comparative Examples 9 and 17, although the linear block PP is contained instead of the component B, and the content of the linear block PP is a relatively small amount of 20 to 30 parts by mass, the expansion ratio retention rate dropped significantly.

Comparative Example 10 contains only the linear block PP. The expansion ratio was very small.

4. Preliminary Experiment Showing Effect of Using Long-Chain Branched Block PP

Here, a preliminary experiment is shown to indicate that reduction in the foam molding property is suppressed by using long-chain branched block PP instead of linear block PP.

The foam duct was produced under the same conditions as in "1. Production of foam duct" except that a composition of the raw material resin was changed to the composition shown in Table 2. Then, the expansion ratio retention rate was calculated.

In series A and C in Table 2, the component A and the component B were used in combination. In series B and D, the component A and the linear block PP were used in combination. In the series A and B, WB140 was used as the component A. In the series C and D, SLB047N was used as the component A. A graph plotting Table 2 is shown in FIG. 3.

TABLE 2

| | Component A Long-chain branched homo-PP | | Component B Long-chain branched block PP | Linear block PP | Expansion ratio | Expansion ratio retention rate |
|---|---|---|---|---|---|---|
| | WB140 | SLB047N | EX6000 | BC4BSW | [—] | [%] |
| Series A | 100 | | 0 | | 4.0 | 100 |
| | 80 | | 20 | | 4.0 | 100 |
| | 70 | | 30 | | 4.0 | 100 |
| | 40 | | 60 | | 4.0 | 100 |
| | 30 | | 70 | | 4.0 | 100 |
| | 10 | | 90 | | 2.0 | 50 |
| | 0 | | 100 | | 1.3 | 45 |
| Series B | 100 | | | 0 | 4.0 | 100 |
| | 80 | | | 20 | 4.0 | 100 |
| | 60 | | | 40 | 3.2 | 80 |
| | 0 | | | 100 | 1.3 | 33 |
| Series C | | 100 | 0 | | 3.2 | 100 |
| | | 80 | 20 | | 3.2 | 100 |
| | | 70 | 30 | | 3.2 | 100 |
| | | 40 | 60 | | 3.0 | 94 |
| | | 10 | 90 | | 2.0 | 63 |
| | | 0 | 100 | | 1.8 | 56 |
| Series D | | 100 | | 0 | 3.2 | 100 |
| | | 80 | | 20 | 2.0 | 63 |
| | | 70 | | 30 | 2.0 | 63 |
| | | 0 | | 100 | 1.3 | 41 |

Figure 3:
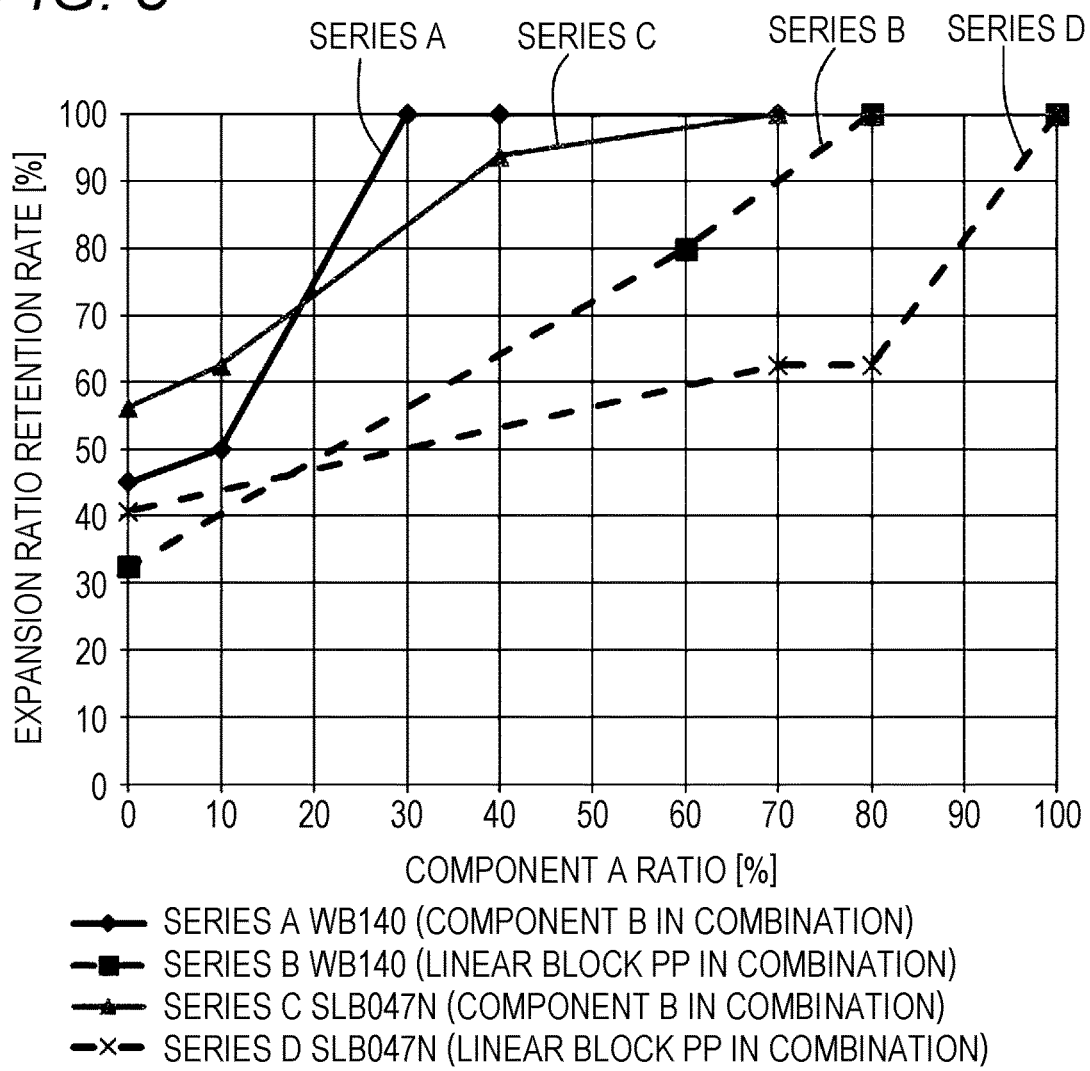
FIG. 3 is a graph showing a relationship between a ratio of a component A and an expansion ratio retention rate.

As shown in Table 2 and FIG. 3, in the series B and D, when the ratio of the component A was reduced to 70%, the expansion ratio retention rate was 90% or less. On the other hand, in the series A and C, the expansion ratio retention rate was higher than 90% even when the ratio of the component A was reduced to 40%. This result indicates that the long-chain branched block PP which is the component B has a degree of deterioration of the foam molding property smaller than the linear block PP.

Second Embodiment

The foam molded article is lightweight. However, it tends to be inferior in mechanical properties to a non-foam molded article. A method of improving the mechanical properties of the foam molded article can be considered by adding a filler such as talc to the foamed resin. However, according to the preliminary experiment by the present inventors, it was found that even if 1.5% by mass of talc is added to the foamed resin, the mechanical properties are hardly improved, that is, moldability is deteriorated when an additional amount of talc is increased.

The present embodiment has been made in view of such circumstances. The present invention provides the method for producing the foam molded article capable of improving the moldability and significantly improving the mechanical properties of the foam molded article.

The invention of the present embodiment provides the method for producing the foam molded article including a step of molding the foamed resin containing an insoluble fiber. In this method, content of the insoluble fiber in the foamed resin is 0.3 to 3% by mass.

The inventors of the present invention have conducted intensive studies to improve the mechanical properties of the foam molded article. It was found that when the content of the insoluble fiber in the foamed resin is 0.3 to 3% by mass, the moldability is good, and the mechanical properties of the foam molded article are significantly improved. Thus, the invention of the present embodiment has been completed.

Hereinafter, various embodiments are exemplified. The embodiments described below can be combined with one another.

The content of the insoluble fiber is preferably 0.6 to 2.1% by mass.

The insoluble fiber is preferably a glass fiber or a carbon fiber.

The insoluble fiber preferably has an average length of 50 to 500 μm in the foam molded article.

The average length is preferably 70 to 120 μm.

The foam molded article preferably has a tensile elastic modulus of 400 MPa or more.

According to another aspect of the present embodiment, there is provided the foam molded article containing the insoluble fiber and having a content of 0.3 to 3% by mass of the insoluble fiber.

The method for producing the foam molded article of the present embodiment includes the step of molding the foamed resin containing the insoluble fiber. The content of the insoluble fiber in the foamed resin is 0.3 to 3% by mass.

Hereinafter, with reference to FIG. 1, the method for producing the foam molded article according to an embodiment of the present invention and the foam molding machine 1 which can be used in the method will be described. Note that the foam molding machine 1 used by the present embodiment is the same as the foam molding machine 1 in the previous first embodiment. Therefore, the foam molding machine 1 will be described also in the present embodiment with reference to FIG. 1.

The foam molding machine 1 includes a resin supply device 2, a head 18, and split mold blocks 19. The resin supply device 2 includes a hopper 12, an extruder 13, an injector 16, and an accumulator 17. The extruder 13 and the accumulator 17 are connected through a connecting pipe 25. The accumulator 17 and the head 18 are connected through a connecting pipe 27.

Each component will be described in detail below.

<Hopper 12, Extruder 13>

The hopper 12 is used to introduce a raw material composition 11 into the cylinder 13a of the extruder 13. A form of the raw material composition 11 is not particularly limited. The form is usually pellet-like. The raw material resin contained in the raw material composition 11 is, for example, a thermoplastic resin such as a polyolefin. Examples of polyolefins include low density polyethylene, linear low density polyethylene, high density polyethylene, polypropylene, ethylene-propylene copolymer, and a mixture thereof. The raw material composition 11 is introduced into the cylinder 13*a* from the hopper 12. Thereafter, it is melted by being heated in the cylinder 13*a*. Thus, the molten resin is obtained. Further, the molten resin is conveyed toward the tip of the cylinder 13*a* by the rotation of the screw disposed in the cylinder 13*a*. The screw is disposed in the cylinder 13*a* and conveys the molten resin being kneaded by its rotation. The gear device is provided at the base end of the screw. The screw is rotationally driven by the gear device. The number of screws disposed in the cylinder 13*a* may be one, two or more.

Figure 4:
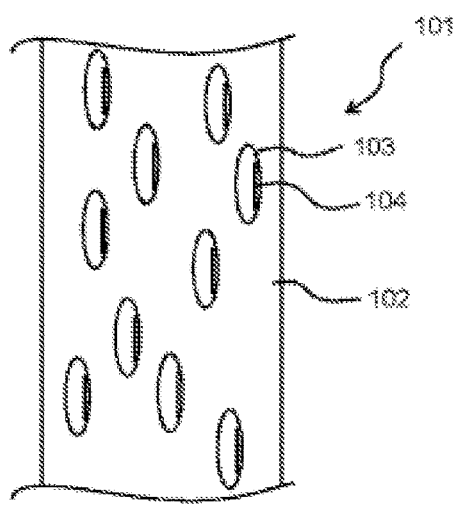
FIG. 4 is a schematic view showing a structure of the foam molded article according to a second embodiment of the present invention.

The raw material composition 11 contains a predetermined amount of the insoluble fiber such that the content of the insoluble fiber in a foamed resin 11*a* described later is 0.3 to 3% by mass. The raw material composition 11 usually contains sodium bicarbonate, talc or the like as the nucleating agent for foaming. However, in the present embodiment, the insoluble fiber functions as the nucleating agent. Therefore, it is not necessary to add the nucleating agent separately. Further, as shown in FIG. 4, a foam molded article 101 is configured such that a large number of cells 103 are dispersed in a resin portion 102. However, the insoluble fiber functions as the nucleating agent. Therefore, the insoluble fiber 104 is disposed to correspond to each cell 103. And, the insoluble fiber 104 has a certain length. Therefore, each cell is reinforced by the insoluble fiber 104. Therefore, when granular fillers such as talc are added, the cells are not reinforced. Therefore, the mechanical properties of the foam molded article are hardly improved. Further, as shown in FIG. 4, the cells 103 generated by the insoluble fiber 104 as the nucleating agent tend to have an elongated shape. Therefore, the insoluble fiber 104 tends to be oriented in a longitudinal direction of the cell 103. When a force in a direction in which the cell bends is applied to the elongated cell 103, the cell 103 tends to be broken. However, the insoluble fiber 104 is oriented in the longitudinal direction of the cell 103. Therefore, a strength against the force in the direction in which the elongated cell 103 bends is particularly increased. Therefore, the mechanical properties of a foam molded article 101 are improved.

Figure 5:
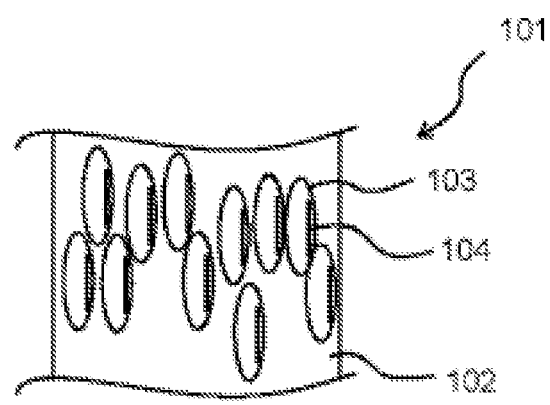
FIG. 5 is a schematic view showing the structure of the foam molded article containing an insoluble fiber added in excess.

The foamed resin 11*a* contains 0.3% by mass or more of insoluble fiber. This improves the mechanical properties of the foam molded article. Further, when the content of the insoluble fiber exceeds 3% by mass, the moldability of the foamed resin 11*a* may be deteriorated. However, by setting the content to 3% by mass or less, the moldability of the foamed resin 11*a* is good. Further, when the content of the insoluble fiber exceeds 3% by mass, the cells 103 excessively formed continue in a thickness direction of the foam molded article 101 as shown in FIG. 5. Or, the cells 103 excessively formed are arranged close to one another. This significantly reduces the strength of the foam molded article 101. However, by setting the content to 3% by mass or less, occurrence of such a problem can be suppressed.

By the way, an effect by containing the filler such as insoluble fiber or talc is largely different between the foam molded article and a solid molded article (the non-foam molded article). In the foam molded article, the mechanical properties are improved as the content of the insoluble fiber increases up to the content of the insoluble fiber of 0.9% by mass. On the other hand, even when the content of the insoluble fiber is further increased, no further improvement in mechanical properties is observed. When the content of the insoluble fiber exceeds 3% by mass, the mechanical properties are deteriorated. On the other hand, in the solid molded article, when the content of the insoluble fiber is 0.9% by mass, no significant improvement in mechanical properties is observed. When the content of the insoluble fiber is 3% by mass, the same improvement in mechanical properties as in the case where the foam molded article contains 3% by mass of the insoluble fiber is observed. Further, when the content of the insoluble fiber is 6 to 9% by mass, the mechanical properties are further significantly improved compared to the case of 3% by mass. Therefore, 6 to 9% by mass of insoluble fiber is usually added in the solid molded article. The content of the insoluble fiber of 0.3 to 3% by mass in the present embodiment is a content which is not usually adopted in the solid molded article. The talc is also a typical filler for improving the mechanical properties of the solid molded article. However, even when the talc is contained in the foam molded article, the mechanical properties are hardly improved. For this reason, no attempt has been made so far to improve the mechanical properties by adding the filler to the foam molded article. Under such circumstances, the present inventors have found that an effect of significantly improving the mechanical properties of the foam molded article is obtained by adding a small amount of insoluble fiber. Such an effect cannot be predicted at all from the related art.

The insoluble fiber may be introduced as it is. However, from the viewpoint of ease of handling, the insoluble fiber is preferably introduced in a form of a masterbatch containing the insoluble fiber. The insoluble fiber is a fiber that does not melt and disappear in a foam molding process. The insoluble fiber is preferably an inorganic fiber, more preferably the glass fiber or the carbon fiber. The content of the insoluble fiber is preferably 0.5% by mass or more, more preferably 0.6% by mass or more. In this case, the mechanical properties of the foam molded article are significantly improved. The content of insoluble fiber is preferably 2.5% by mass or less, more preferably 2.1% by mass or less. This is because, the moldability of the foamed resin 11*a* is further improved in this case. Specifically, the content of the insoluble fiber is, for example, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, or 3% by mass. The content may be in a range between any two of the numerical values exemplified here.

In the foam molded article, insoluble fibers have an average length of, for example, 50 to 500 μm, preferably 70 to 120 μm, specifically for example, 50, 70, 100, 120, 150, 200, 250, 300, 350, 400, 450, or 500 μm. The average length may be in a range between any two of the numerical values exemplified here. In the foam molded article, the insoluble fibers have an average diameter of, for example, 1 to 30 μm, specifically for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 μm. The average diameter may be in a range between any two of the numerical values exemplified here. In the foam molded article, the insoluble fibers have an average aspect ratio of, for example, 3 to 100, preferably 5 to 25, specifically for example, 3, 5, 10, 15, 20, 25, 30, 35, 40, 45, 50, 55, 60, 65, 70, 75, 80, 85, 90, 95, or 100. The average aspect ratio may be in a range between any two of the numerical values exemplified here.

The average length, the average diameter, and the average aspect ratio of the insoluble fibers in the foam molded article are obtained as follows. That is, an image of a cross-section of the foam molded article, which is constituted by (thickness of the foam molded article)×(twice of the thickness of the foam molded article), is cut out. All fibers with a length of 30 to 1000 μm, which are visible in the image, are picked up. Then, the length, the diameter, and the aspect ratio (length/diameter) of each fiber are measured. By arithmetically averaging the measured values, the average length, the average diameter, and the average aspect ratio of the insoluble fibers in the foam molded article can be calculated.

The insoluble fibers have an average length of, for example, 1 to 10 mm, preferably 2 to 5 mm, specifically for example 1, 2, 3, 4, 5, 6, 7, 8, 9, or 10 mm in a form of pellets. The average length may be in a range between any two of the numerical values exemplified here. The average diameter of the insoluble fibers in the form of pellets is the same as the average diameter of the insoluble fibers in the foam molded article. The insoluble fibers have an average aspect ratio of, for example, 100 to 2000, specifically for example, 100, 200, 300, 400, 500, 600, 700, 800, 900, 1000, 1100, 1200, 1300, 1400, 1500, 1600, 1700, 1800, 1900 or 2000 in the form of pellets. The average aspect ratio may be in a range between any two of the numerical values exemplified here. The average length, the average diameter and the average aspect ratio of the insoluble fibers in the form of pellets are obtained as follows. That is, ten insoluble fibers are randomly selected from the insoluble fibers observed on a surface of the pellet. The length, the diameter, and the aspect ratio of each selected fiber are measured. The average length, the average diameter, and the average aspect ratio of insoluble fibers in the form of pellets are calculated by calculating and averaging the measured values.

<Injector 16>

The cylinder 13a is provided with an injector 16 for injecting the foaming agent into the cylinder 13a. The foaming agents injected from the injector 16 include the physical foaming agents, the chemical foaming agents, and mixtures thereof. The physical foaming agents are preferable. The physical foaming agents which can be used include inorganic physical foaming agents such as air, carbon dioxide gas, nitrogen gas and water, organic physical foaming agents such as butane, pentane, hexane, dichloromethane, dichloroethane, and supercritical fluid thereof. The supercritical fluid is preferably prepared using carbon dioxide, nitrogen or the like. In the case of nitrogen, the supercritical fluid is obtained at a critical temperature of 149.1° C. and a critical pressure of 3.4 MPa or more. In the case of carbon dioxide, the supercritical fluid is obtained at a critical temperature of 31° C. and a critical pressure of 7.4 MPa or more. The chemical foaming agents include chemical foaming agents that generate carbon dioxide gas through the chemical reaction of the acid (example: citric acid or salt thereof) and the base (example: sodium bicarbonate). The chemical foaming agent may be introduced from the hopper 12 instead of being injected from the injector 16.

<Accumulator 17, Head 18>

The foamed resin 11a containing the raw material composition 11 and the foaming agent melt-kneaded is formed. The content of insoluble fiber in the foamed resin 11a is 0.3 to 3% by mass. The foamed resin 11a is extruded from the resin extrusion port of the cylinder 13a and injected into the accumulator 17 through the connecting pipe 25. The accumulator 17 includes the cylinder 17a, and the piston 17b slidable therein. The foamed resin 11a can be stored in the cylinder 17a. Then, the foamed resin 11a is stored by a predetermined amount in the cylinder 17a. Thereafter, the piston 17b moves. Thus, the foamed resin 11a is extruded from the die slit provided in the head 18 through the connecting pipe 27 and suspended to form the foamed parison 23. The shape of the foamed parison 23 is not particularly limited. The shape may be cylindrical or sheet-like.

<Split Mold Block 19>

The foamed parison 23 is introduced between the pair of split mold blocks 19. The foam molded article is obtained by molding the foamed parison 23 using the split mold blocks 19. The molding method using the split mold blocks 19 is not particularly limited. The blow molding may be performed including molding with air blown into the foamed parison 23 after mold clamping. The vacuum molding, in which the foamed parison 23 is molded by reducing the pressure in the cavity from the inner surface of the cavity of the split mold blocks 19, may be performed. The combination of the blow molding and the vacuum molding may be performed. The foam molded article has an expansion ratio of, for example, 1.5 to 6 times, specifically for example, 1.5, 2, 2.5, 3, 3.5, 4, 4.5, 5, 5.5 or 6. The expansion ratio may be in a range between any two of the numerical values exemplified here. The expansion ratio can be calculated based on the following formula (1).

$$\text{Expansion ratio} = (\text{specific gravity of unfoamed raw material composition 11})/(\text{specific gravity of foam molded article}) \quad (1)$$

The foam molded article has a tensile elastic modulus of, for example, 250 MPa to 800 MPa, preferably 400 MPa or more. By containing an appropriate amount of insoluble fiber in the foam molded article, the tensile elastic modulus of 400 MPa or more of the foam molded article can be obtained. The tensile elastic modulus is specifically, for example, 250, 300, 350, 400, 450, 500, 550, 600, 650, 700, 750, or 800 MPa. The tensile elastic modulus may be in a range between any two of the numerical values exemplified here.

Example

A cylindrical foam molded article was produced using the foam molding machine 1 shown in FIG. 1. The inside diameter of the cylinder 13a of the extruder 13 was 50 mm, and its L/D=34. The raw material composition contains polypropylene-based resin A (produced by *Borealis* AG, trade name "Daploy WB140") and polypropylene-based resin B (produced by Japan Polypropylene Corporation, trade name "Novatec PP BC4BSW") mixed at a mass ratio of 60:40. Inorganic filler of the kind and parts by mass which was shown in Table 3 with respect to 100 parts by mass of resin was added to this mixture. The insoluble fiber is added as the pellets containing the resin and the insoluble fiber. The parts by mass of the insoluble fiber in Table 3 is not the parts by mass of the whole pellets but the parts by mass of only the insoluble fiber. The temperature of each portion was controlled so that the temperature of the foamed parison 23 was 190 to 200° C. The number of revolutions of the screw was 60 rpm. The extrusion amount was 20 kg/hr. The $N_2$ gas was used as the foaming agent. The $N_2$ gas was injected through the injector 16. An amount of $N_2$ gas was injected so that the expansion ratio of the molded article finally molded was 2.8 to 3.0. The foamed parison 23 was formed such that the molded article had a thickness of about 2 mm.

The foamed parison 23 formed under the above conditions was disposed between the split mold blocks 19. The blow molding was performed by blowing air into the foamed parison 23 after mold clamping. In this way, the foam molded article having a thickness of about 2 mm was formed. A tensile test was performed using the foam molded article, and valuation was performed according to the following criteria. The tensile test was performed according to JIS K 7113. Test speed for tension was 50 mm/min. A dumbbell shape for the test was No. 2.

(Moldability)
Excellent: Foam molded article having a desired shape was obtained
Good: Although foam molded article having a desired shape was obtained, bubble accumulation occurred on surface of foam molded article
Poor: Foam molded article having a desired shape was not obtained
(Strength at Break)
Excellent: 7.5 MPa or more
Good: 6.5 MPa or more and less than 7.5 MPa
Fair: 5.5 MPa or more and less than 6.5 MPa
Poor: less than 5.5 MPa
(Tensile Elastic Modulus)
Excellent: 500 MPa or more
Good: 400 MPa or more and less than 500 MPa
Fair: 270 MPa or more and less than 400 MPa
Poor: less than 270 MPa Glass fiber: GF PP-MG60 produced by Asahi Fiber Glass Co., Ltd., length 3 mm, diameter 17 μm in the form of pellets
Talc: MAT-725TP produced by Shiraishi Calcium Kaisha, Ltd.

As shown in Comparative Examples 22 to 25, even when 0.3 to 1.5% by mass of talc was added, the mechanical properties (strength at break, tensile elastic modulus) were hardly improved. On the other hand, when 3% by mass of talc was added, the moldability was significantly deteriorated. On the other hand, as shown in Examples 11 to 20, when 0.3 to 3% by mass of insoluble fiber is added, the strength at break was significantly improved. Further, when the insoluble fiber was added at 0.6 to 3% by mass, the strength at break was further improved. At the same time, the tensile elastic modulus was also significantly improved. Further, when 3% by mass of insoluble fiber was added, the moldability was slightly deteriorated. However, when the carbon fiber is a short fiber and the additional amount of the insoluble fiber is 2.1% by mass or less, the deterioration of the moldability was not observed. When the carbon fiber is a long fiber, the moldability was worse than that in the case of the short fiber.

Figure 6:
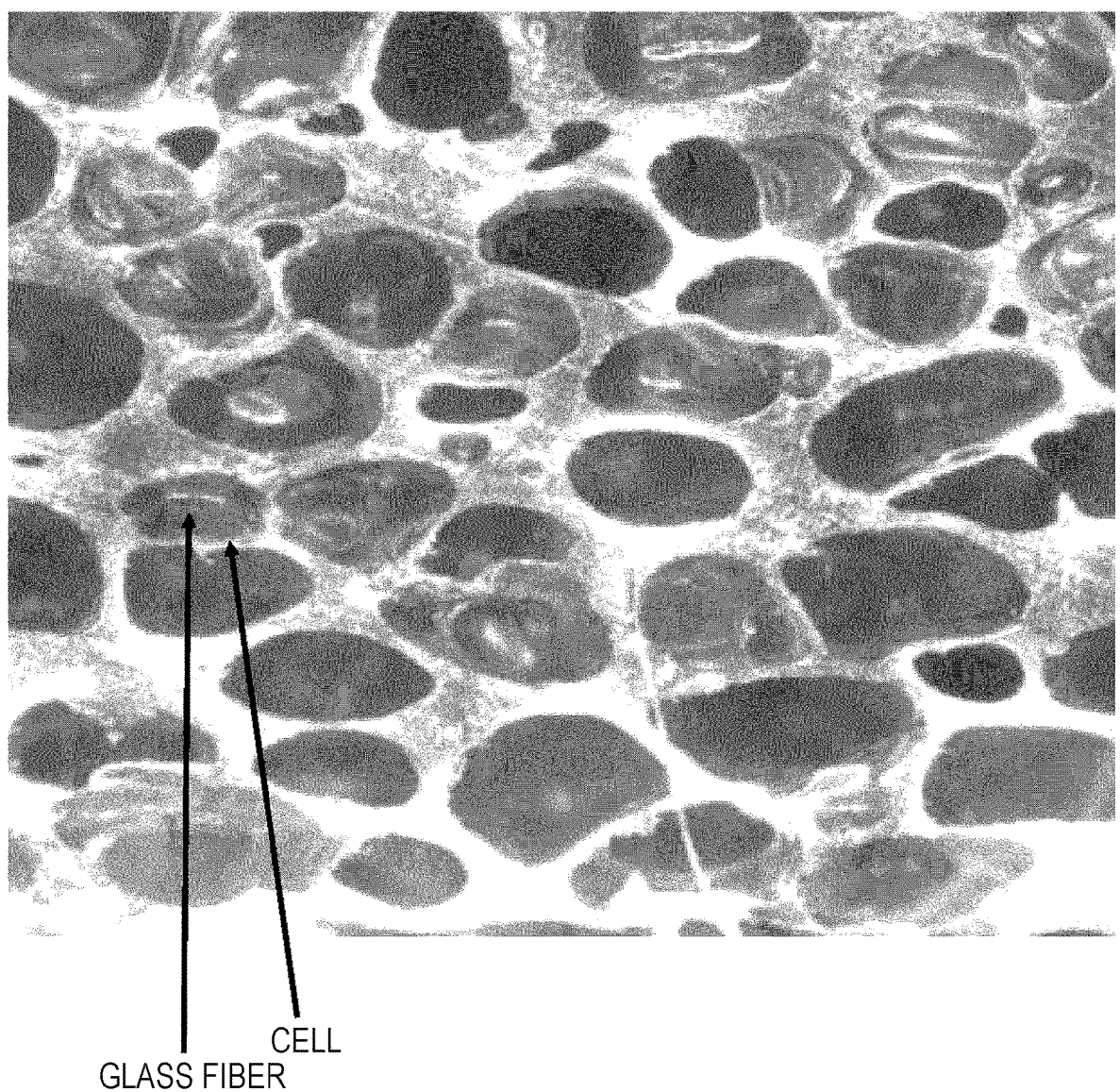
FIG. 6 is a cross-sectional photograph of the foam molded article of Example 13.

A cross-sectional photograph of the foam molded article of Example 13 is shown in FIG. 6. It can be seen that the

TABLE 3

| | | Example | | | | | | | | | |
|---|---|---|---|---|---|---|---|---|---|---|---|
| | | 11 | 12 | 13 | 14 | 15 | 16 | 17 | 18 | 19 | 20 |
| Inorganic filler (nucleating agent) | Carbon fiber (short fiber) | 0.3 | 0.6 | 0.9 | 1.5 | 2.1 | 3 | — | — | — | — |
| | Carbon fiber (long fiber) | | | | | | | 0.9 | 1.5 | | |
| | Glass fiber | | | | | | | | | 0.9 | 1.5 |
| | Sodium bicarbonate | — | — | — | — | — | — | — | — | — | — |
| | Talc | | | | | | | | | | |
| Evaluation | Moldability | Excellent | Excellent | Excellent | Excellent | Excellent | Good | Good | Good | Excellent | Excellent |
| | Strength at break MPa | Fair 5.8 | Good 7.0 | Excellent 7.7 | Excellent 7.5 | Excellent 7.5 | Good 7.2 | Excellent 8.3 | Excellent 8.3 | Good 7.2 | Good 6.8 |
| | Tensile elastic modulus MPa | Fair 281 | Good 449 | Excellent 554 | Excellent 545 | Excellent 540 | Good 490 | Excellent 603 | Excellent 611 | Excellent 552 | Excellent 549 |

| | | Example Comparative | | | | | | | |
|---|---|---|---|---|---|---|---|---|---|
| | | 18 | 19 | 20 | 21 | 22 | 23 | 24 | 25 |
| Inorganic filler (nucleating agent) | Carbon fiber (short fiber) | — | 4.5 | — | — | — | — | — | — |
| | Carbon fiber (long fiber) | | | | | | | | |
| | Glass fiber | | | | | | | | |
| | Sodium bicarbonate | | | 0.3 | 0.9 | — | — | — | — |
| | Talc | — | — | — | — | 0.3 | 0.9 | 1.5 | 3 |
| Evaluation | Moldability | Poor | Poor | Excellent | Excellent | Excellent | Excellent | Good | Poor |
| | Strength at break MPa | — | — | Poor 4.9 | Poor 5.2 | Poor 5.0 | Poor 5.3 | Poor 5.4 | — |
| | Tensile elastic modulus MPa | — | — | Fair 294 | Fair 322 | Fair 303 | Fair 344 | Fair 346 | — |

As inorganic fillers in Table 3, the following inorganic fillers were used. Carbon fiber (short fiber): PYROFIL PP-C-30A produced by Mitsubishi Rayon Co., Ltd., length 3 mm, diameter 6 μm in the form of pellets
Carbon fiber (long fiber): PPLCF30 produced by Chuo Kaseihin Co., Inc., length 7 mm, diameter 6 μm in the form of pellets elongated cells are formed and the insoluble fibers are oriented in the longitudinal direction of the cells. The carbon fiber (short fiber) contained in the foam molded article of Example 13 had an average length of 100 μm. The carbon fiber (long fiber) contained in the foam molded article of Example 17 had an average length of 150 μm. Incidentally, the insoluble fiber was broken during melt-kneading or the like. Therefore, the average length of the insoluble fiber contained in the foam molded article is shorter than that of the insoluble fiber in the form of pellets.

Third Embodiment

When a shape of a desired molded article was significantly different from the shape of the parison, pre-blowing was performed in order to improve the moldability. That is, the air was blown into the parison pinched by a pinch portion disposed below the split mold blocks before clamping.

However, in this method, a balloon-like burr may be formed between the split mold blocks and the pinch portion. A rate at which the balloon-like burr is cooled and solidified is usually lower than a rate at which the molded article is cooled and solidified in the split mold blocks. The molded article is usually taken out after the burr has been cooled and solidified. Therefore, production efficiency of the molded article may be reduced because a cooling rate of the burr is low.

The present embodiment has been made in view of such circumstances. According to the present embodiment, there is provided the method for producing the molded article capable of improving the production efficiency of the molded article.

According to the present embodiment, there is provided the method for producing the molded article, including: an extrusion step including extruding the molten resin to form a tubular parison, and extruding the parison between the pair of split mold blocks; a pinching step including pinching the parison by the pinch portion disposed below the split mold blocks; and a molding step including performing clamping of the split mold blocks to mold the parison after the pinching step. This production method further includes an opening forming step including forming an opening in a balloon-like lower burr portion formed by expansion of the parison below the split mold blocks during the molding step, using an opening forming member.

The present inventors have found that high-temperature air warmed by heat of the parison is inside the balloon-like burr between the split mold blocks and the pinch portion, and therefore, the cooling rate of the burr is low. Based on this knowledge, it was found that the cooling rate of the burr can be increased by discharging the high-temperature air by forming the opening in the burr using the opening forming member. As a result, it was also found that the production efficiency of the molded article can be improved. Thus, the present invention has been completed.

Hereinafter, various embodiments are exemplified. The embodiments described below can be combined with one another.

The opening is preferably formed in a groove shape.

The opening forming member is preferably in an elongated shape. The opening forming member is preferably disposed such that an angle between a clamping direction of the split mold blocks and a longitudinal direction of the opening forming member is 20 to 70 degrees.

The opening forming member preferably has a thickness of 2 mm or more projected on a plane perpendicular to the clamping direction of the split mold blocks.

The opening forming member preferably includes a pipe portion.

The pipe portion preferably has a pointed tip portion.

The pointed tip portion preferably projects at a side close to the split mold blocks.

A cooling step including cooling the lower burr portion by blowing cooling air to the lower burr portion is preferably included.

The cooling air is preferably blown to a position facing the opening forming member across the parison.

A pre-blowing step including blowing the air into the parison is preferably further included after the pinching step and before the molding step.

According to another aspect of the present invention, there is provided an apparatus for producing the molded article, including: the pair of split mold blocks for forming the molded article by molding the tubular parison; the pinch portion; and the opening forming member. The pinch portion is configured to be disposed below the split mold blocks and to sandwich the parison. The opening forming member is disposed between the split mold blocks and the pinch portion. Further, the opening forming member is configured such that the opening is formed in the balloon-like lower burr portion formed by expansion of the parison below the split mold blocks when the split mold blocks are clamped.

1. Structure of Molding Machine 1

Figure 7:
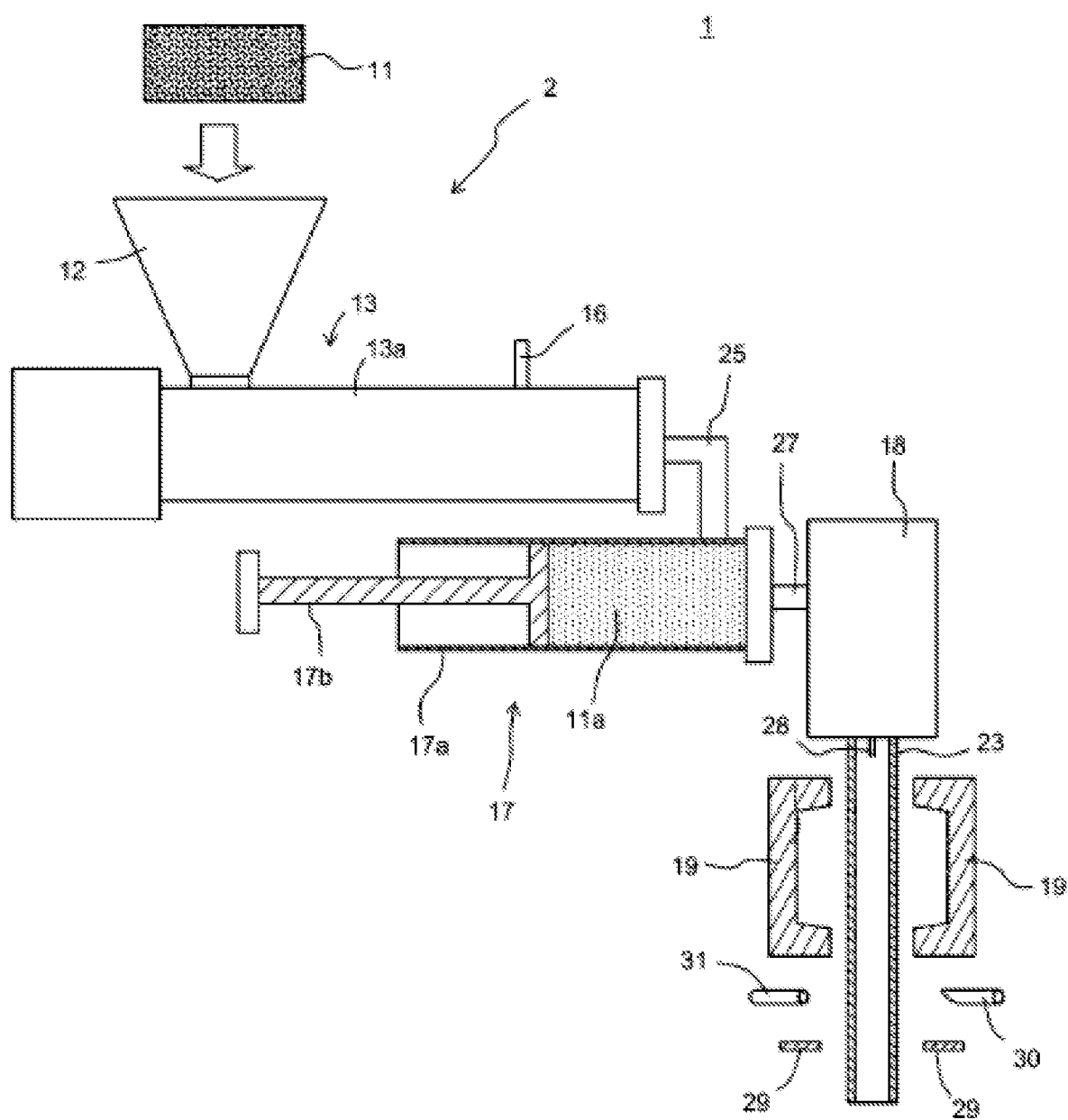
FIG. 7 shows an example of the molding machine 1 which can be used in a method for producing the foam molded article according to a third embodiment of the present invention.

First, the molding machine 1 that can be used to perform the method for producing the molded article according to an embodiment of the present invention will be described with reference to FIG. 7. In FIG. 7, the same components as those of the molding machine 1 shown in FIG. 1 used in the previous first and second embodiments are denoted by the same reference numerals.

The molding machine 1 used in the present embodiment includes the resin supply device 2, the head 18, the split mold blocks 19, the pinch portion 29, an opening forming member 30, and an air outlet 31. The resin supply device 2 includes the hopper 12, the extruder 13, the injector 16, and the accumulator 17. The extruder 13 and the accumulator 17 are connected through the connecting pipe 25. The accumulator 17 and the head 18 are connected through the connecting pipe 27.

Each component will be described in detail below.

<Hopper 12, Extruder 13>

The hopper 12 is used to introduce a raw material resin 11 into the cylinder 13a of the extruder 13. A form of the raw material resin 11 is not particularly limited. The form is usually pellet-like. The raw material resin 11 is, for example, a thermoplastic resin such as a polyolefin. Examples of polyolefins include low density polyethylene, linear low density polyethylene, high density polyethylene, polypropylene, ethylene-propylene copolymer, and a mixture thereof. The raw material resin 11 is introduced into the cylinder 13a from the hopper 12. Thereafter, it is melted by being heated in the cylinder 13a. Thus, the molten resin is obtained. Further, the molten resin is conveyed toward the tip of the cylinder 13a by the rotation of the screw disposed in the cylinder 13a. The screw is disposed in the cylinder 13a and conveys the molten resin being kneaded by its rotation. The gear device is provided at the base end of the screw. The screw is rotationally driven by the gear device. The number of screws disposed in the cylinder 13a may be one, two or more.

<Injector 16>

The cylinder 13a is provided with an injector 16 for injecting the foaming agent into the cylinder 13a. When not foaming the raw material resin 11, the injector 16 can be omitted.

The foaming agents injected from the injector 16 include the physical foaming agents, the chemical foaming agents, and mixtures thereof. The physical foaming agents are preferable. The physical foaming agents which can be used include inorganic physical foaming agents such as air, carbon dioxide gas, nitrogen gas and water, organic physical foaming agents such as butane, pentane, hexane, dichloromethane, dichloroethane, and supercritical fluid thereof. The supercritical fluid is preferably prepared using carbon dioxide, nitrogen or the like. In the case of nitrogen, the supercritical fluid is obtained at a critical temperature of 149.1° C. and a critical pressure of 3.4 MPa or more. In the case of carbon dioxide, the supercritical fluid is obtained at a critical temperature of 31° C. and a critical pressure of 7.4 MPa or more. The chemical foaming agents include chemical foaming agents that generate carbon dioxide gas through the chemical reaction of the acid (example: citric acid or salt thereof) and the base (example: sodium bicarbonate). The chemical foaming agent may be introduced from the hopper 12 instead of being injected from the injector 16.

<Accumulator 17, Head 18>

A molten resin 11a to which the foaming agent is added or not added is extruded from the resin extrusion port of the cylinder 13a and injected into the accumulator 17 through the connecting pipe 25. The accumulator 17 includes the cylinder 17a, and the piston 17b slidable therein. The molten resin 11a can be stored in the cylinder 17a. After the molten resin 11a is stored in the cylinder 17a by a predetermined amount, the piston 17b moves. Thus, the molten resin 11a is extruded from the die slit provided in the head 18 through the connecting pipe 27 and suspended to form a tubular parison 23. The head 18 is provided with a pre-blowing nozzle 28.

The air can be blown into the parison 23 from the pre-blowing nozzle 28 before clamping of the split mold blocks 19.

<Split Mold Block 19, Pinch Portion 29, Opening Forming Member 30, Air Outlet 31>

The parison 23 is introduced between the pair of split mold blocks 19. The molded article is obtained by molding the parison 23 using the split mold blocks 19. The molding method using the split mold blocks 19 is not particularly limited. The blow molding may be performed including molding with air blown into the cavity of the split mold blocks 19. The vacuum molding may be performed including molding the parison 23 by reducing the pressure in the cavity from the inner surface of the cavity of the split mold blocks 19. The combination of the blow molding and the vacuum molding may be performed. When the molten resin contains the foaming agent, the parison 23 becomes the foamed parison. And the molded article becomes the foam molded article.

The pinch portion 29 is provided below the split mold blocks 19. It is possible to form an enclosed space 23s in the parison 23 before clamping of the split mold blocks 19 by sandwiching the parison 23 by the pinch portion 29. The opening forming member 30 and the air outlet 31 are provided between the split mold blocks 19 and the pinch portion 29. The opening 23b1 (shown in FIG. 13(c)) is formed using the opening forming member 30 in the balloon-like lower burr portion 23b (shown in FIG. 11) formed when the split mold blocks 19 are clamped. The air outlet 31 is provided at a position facing the opening forming member 30 across the parison 23. The lower burr portion 23b can be solidified by blowing the cooling air discharged from the air outlet 31 to the lower burr portion 23b.

2. Method for Producing Foam Molded Article

The method for producing the foam molded article according to the embodiment of the present invention includes the extrusion step, the pinching step, the pre-blowing step, the molding step, the opening forming step, the cooling step, and a post step.

<Extrusion Step>

Figure 8:
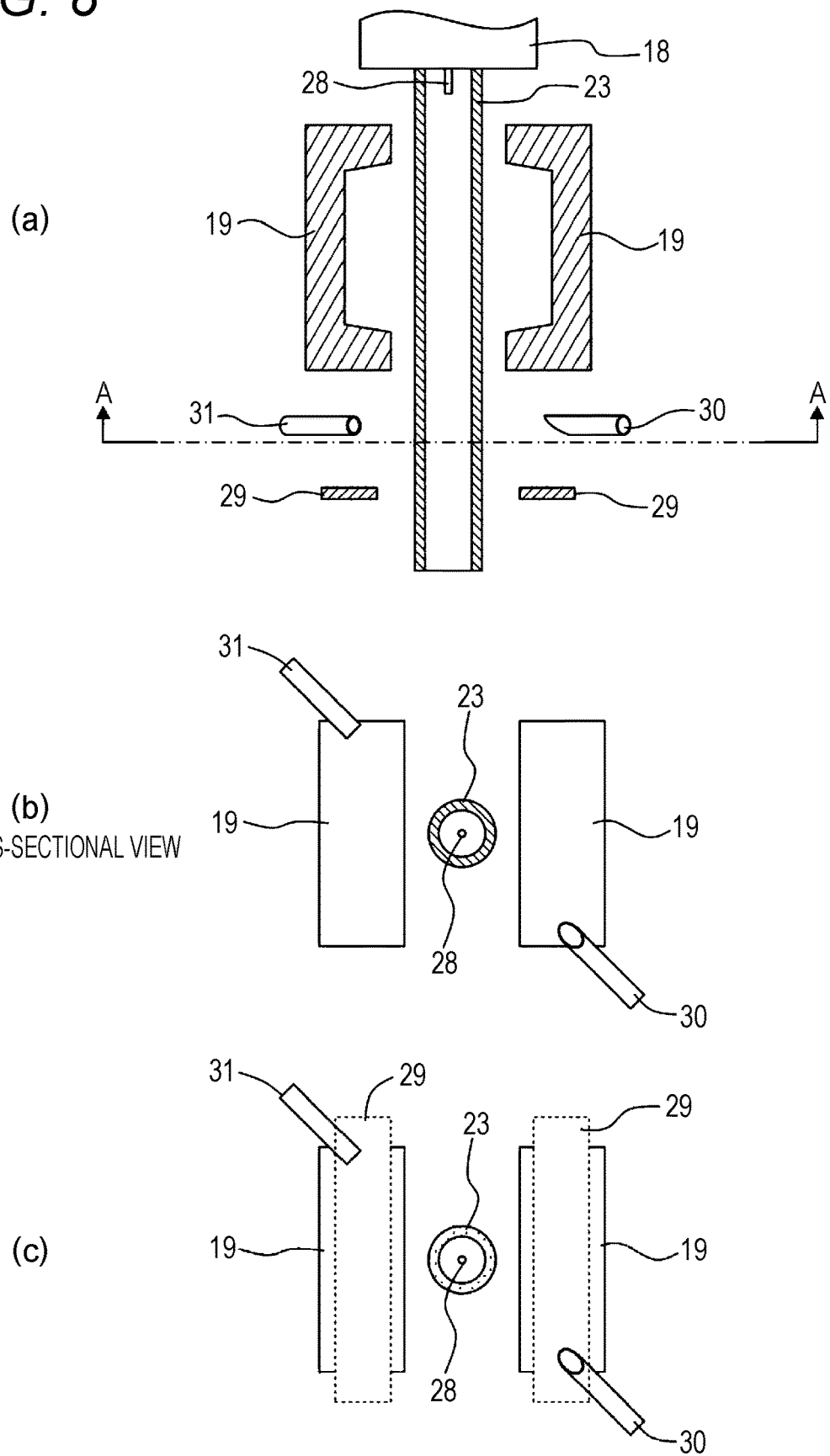
FIG. 8 shows an extrusion step.

As shown in FIG. 8, the tubular parison 23 formed of an extruded molten resin is extruded between the pair of split mold blocks 19 in the extrusion step.

<Pinching Step>

Figure 9:
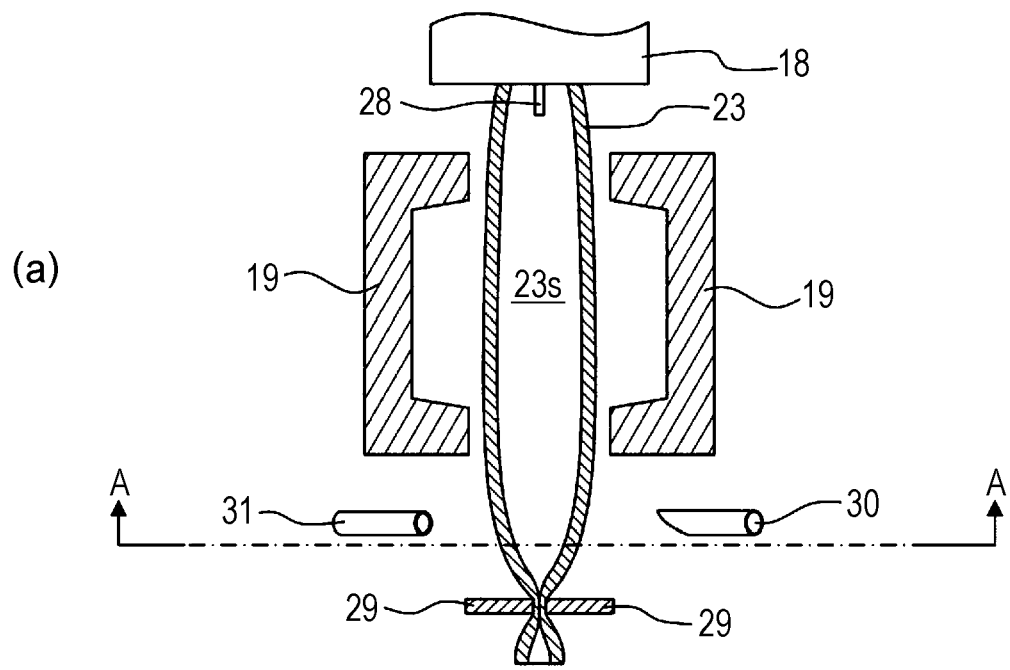
FIG. 9 shows a pinching step.
Figure 9:
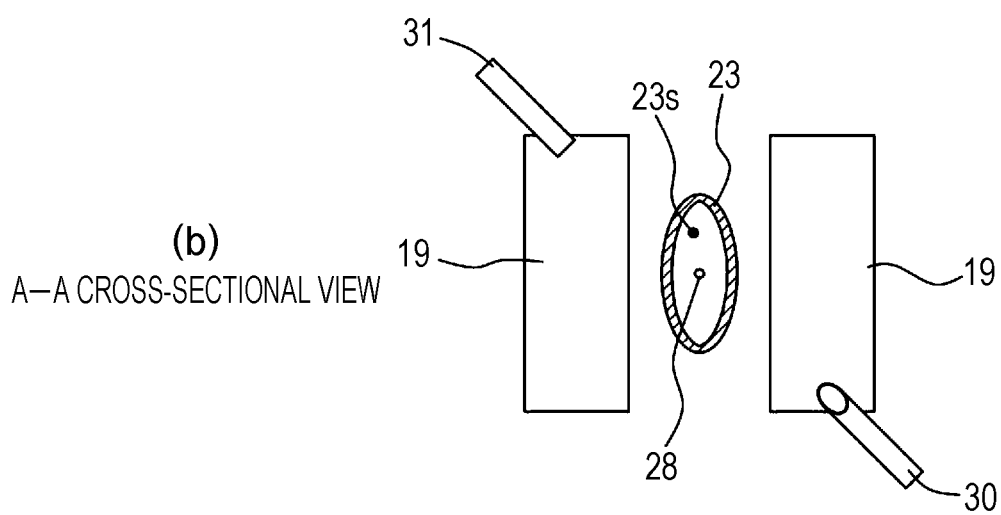

As shown in FIG. 9, the parison 23 is pinched by the pinch portion 29 disposed below the split mold blocks 19 in the pinching step. Thus, the enclosed space 23s is formed in the parison 23.

<Pre-Blowing Step>

Figure 10:
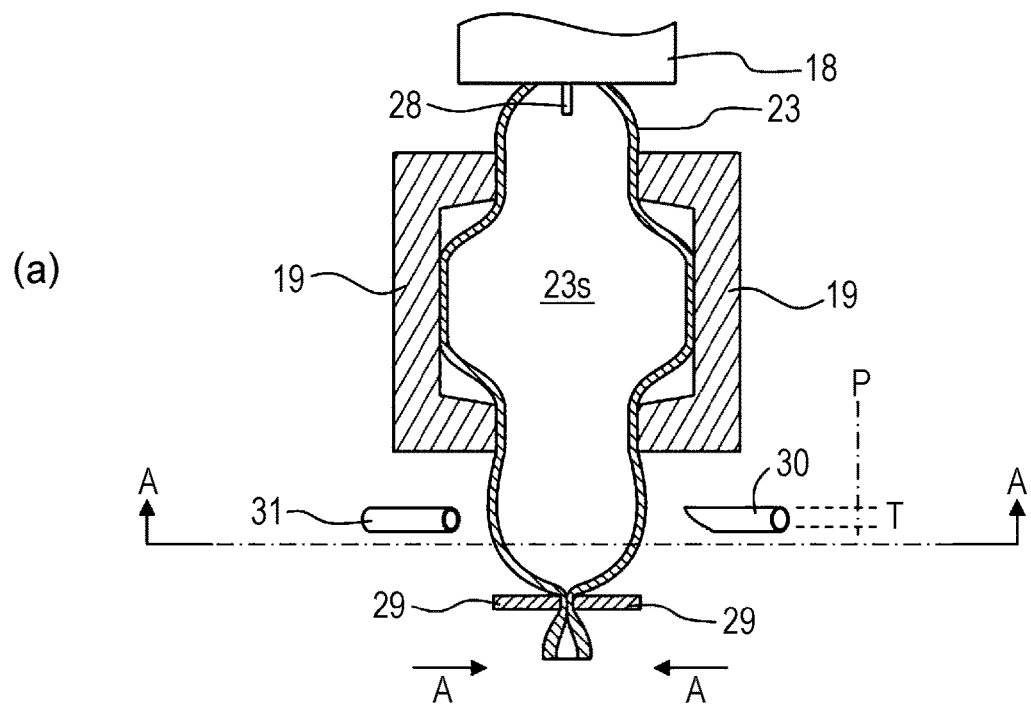
FIG. 10 shows a pre-blowing step.
Figure 10:
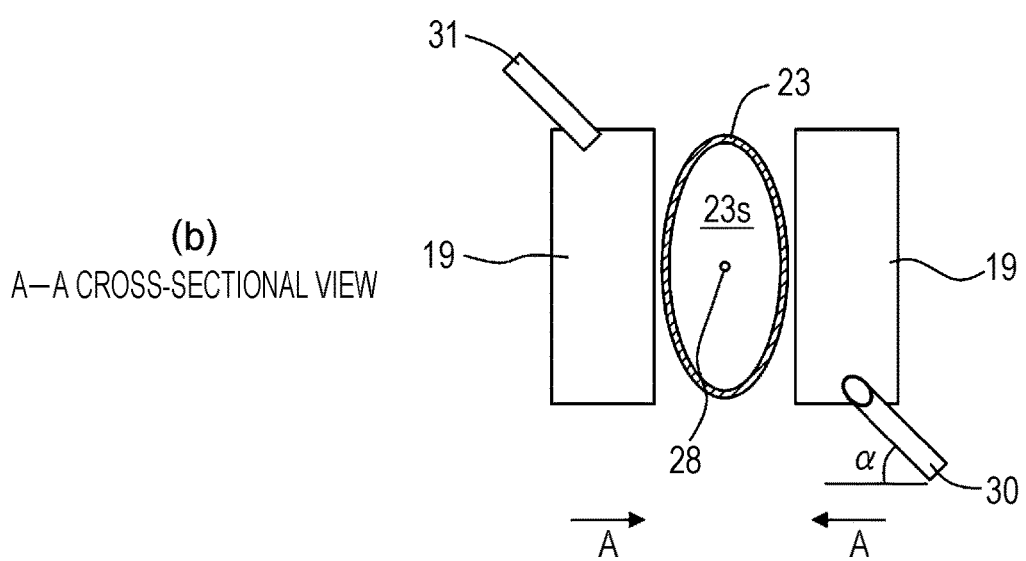

As shown in FIG. 10, in the pre-blowing step, the parison 23 is expanded by the air blown into the enclosed space 23s from the pre-blowing nozzle 28 (that is, by performing the pre-blowing). The pre-blowing step is a step performed to improve the moldability. The pre-blowing step is unnecessary depending on the shape of the molded article.

<Molding Step>

Figure 11:
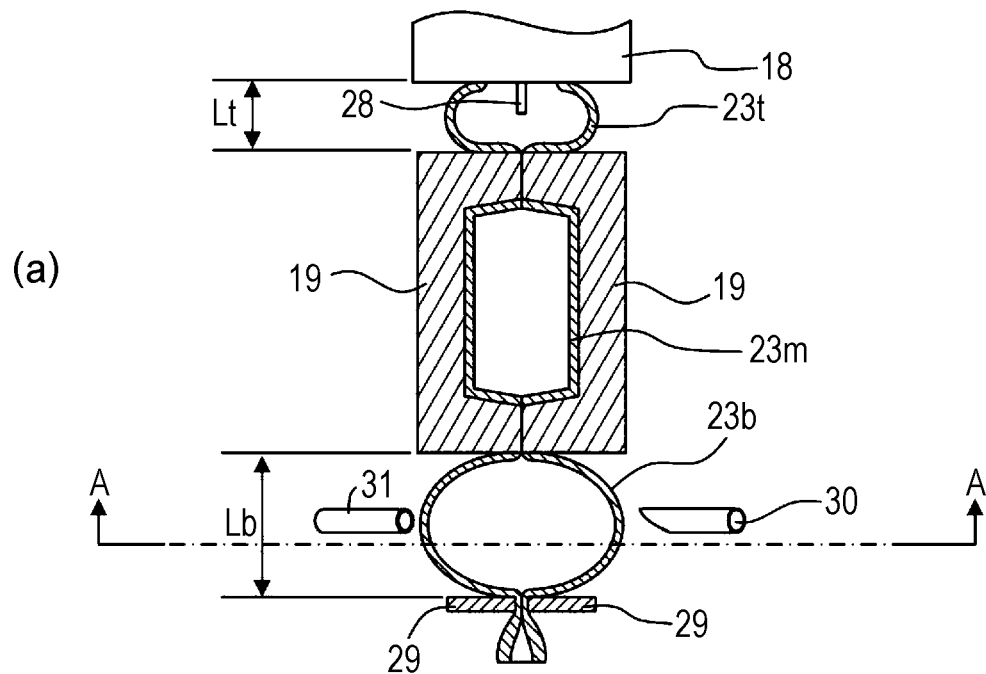
FIG. 11 shows a molding step.
Figure 11:
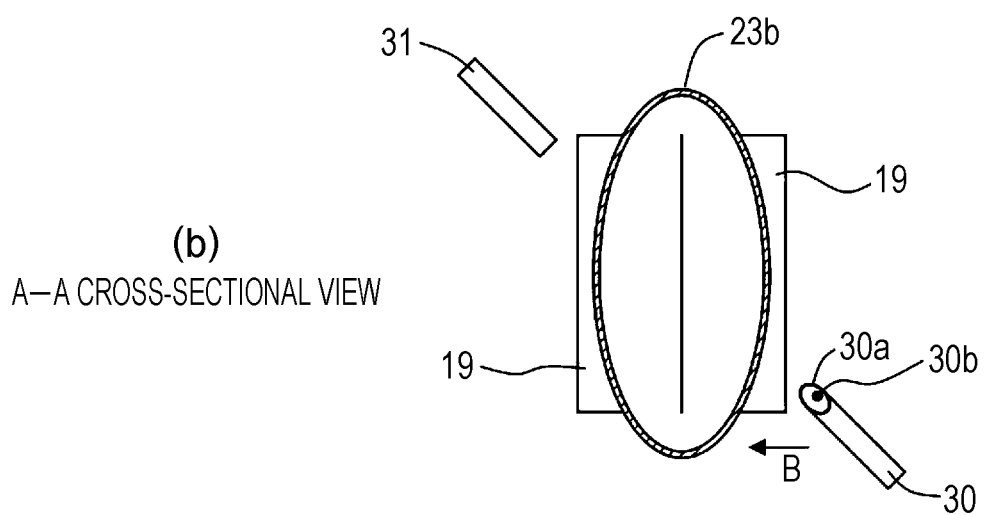

As shown in FIGS. 10 to 11, the parison 23 is molded by clamping the split mold blocks 19 in the molding step. At this time, a molded article 23m is formed in the split mold blocks 19. An upper burr portion 23t is formed above the split mold blocks 19. The lower burr portion 23b is formed below the split mold blocks 19. As shown in FIG. 11, the upper burr portion 23t and the lower burr portion 23b have a balloon shape.

By the way, a water cooling pipe is usually provided in the split mold blocks 19. After the parison 23 is shaped into the shape of the molded article 23m, the molded article 23m can be cooled quickly by the water cooling pipe. Therefore, the molded article 23m in the split mold blocks 19 is quickly cooled by the split mold blocks 19. On the other hand, the upper burr portion 23t and the lower burr portion 23b outside the split mold blocks 19 are not cooled by the split mold blocks 19. Therefore, the cooling rate is slow. In general, a distance Lb between a lower end of the split mold blocks 19 and the pinch portion 29 is larger than a distance Lt between the head 18 and an upper end of the split mold blocks 19. Therefore, an amount of resin constituting the lower burr portion 23b is larger than the amount of resin constituting the upper burr portion 23t. Therefore, the lower burr portion 23b is more difficult to be cooled than the upper burr portion 23t. Therefore, need to increase the cooling rate of the lower burr portion 23b is high.

Further, when the parison 23 is the foamed parison, the parison 23 tends to have a corrugated shape. In this case, when the distance Lb is short, outer surfaces of the parison 23 are fused to each other. As a result, a phenomenon called "fold", in which a streak remains on the outer surface of the molded article, tends to occur. Therefore, when the parison 23 is the foamed parison, the distance Lb may have to be increased. In this case, the amount of resin constituting the lower burr portion 23b is further increased. Therefore, the need to increase the cooling rate of the lower burr portion 23b is even higher.

<Opening Forming Step>

Figure 12:
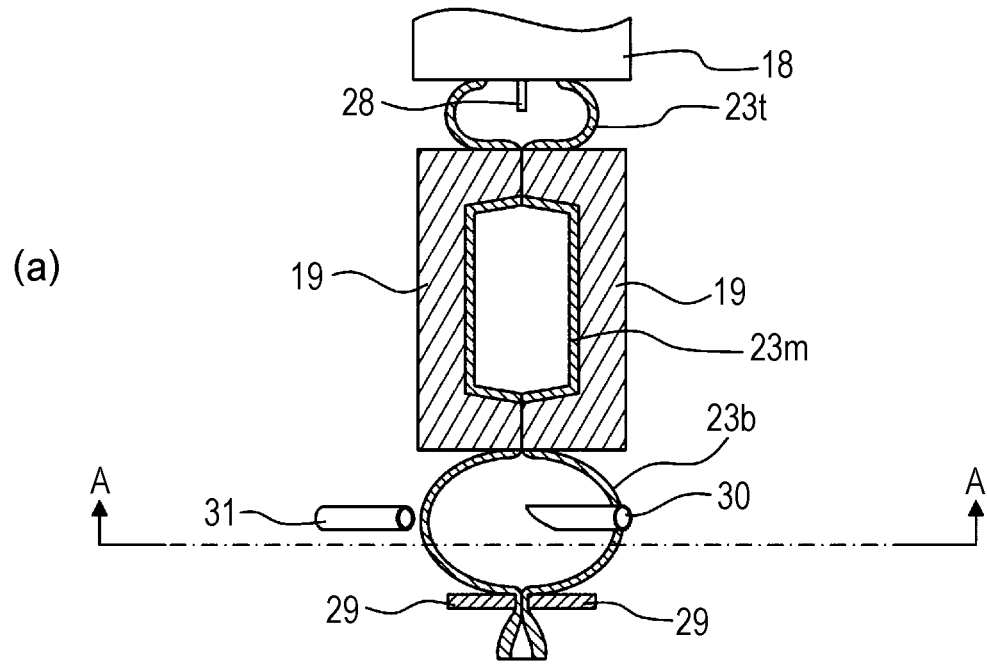
FIG. 12 shows an opening forming step and a cooling step.
Figure 12:
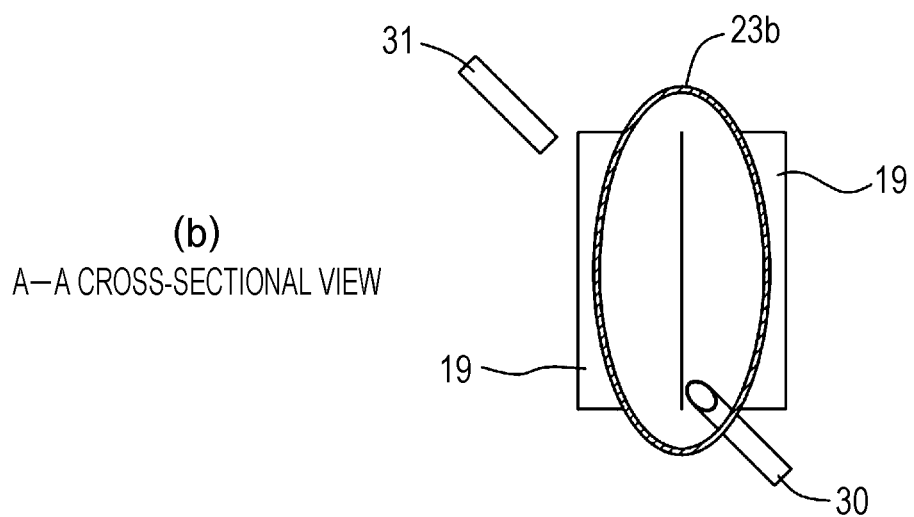
Figure 13:
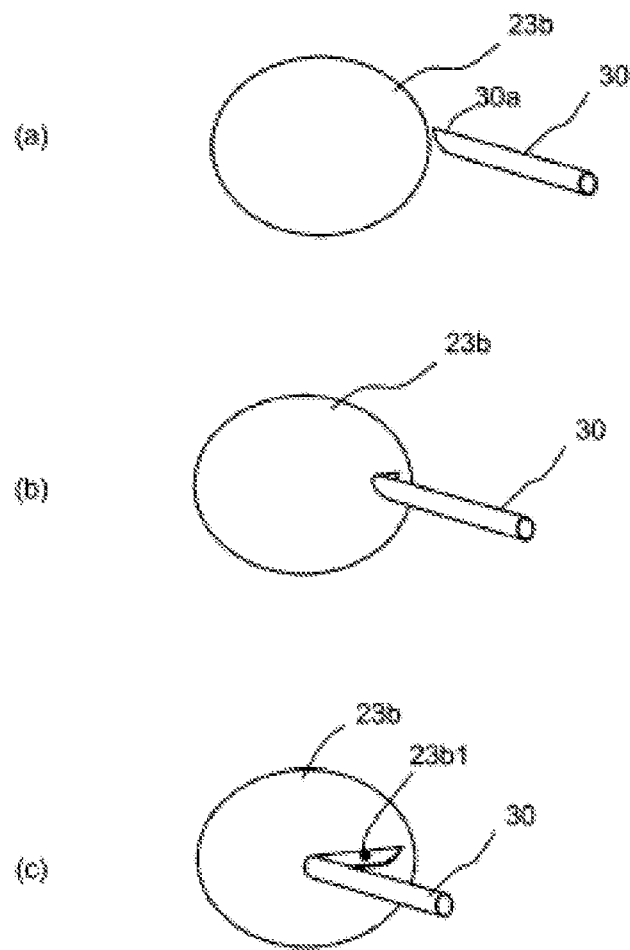
FIG. 13 shows a step of forming a groove-like opening 23b1 by cutting a lower burr portion 23b using an opening forming member 30.

As shown in FIGS. 11 to 13, in the opening forming step, the opening 23b1 is formed in the balloon-like lower burr portion 23b using the opening forming member 30. The opening forming step may be performed in the middle of the molding step. Or, the opening forming step may be performed after completion of the molding step. In other words, the opening forming step may be performed while the split mold blocks 19 are moving at the time of clamping. Or, the opening forming step may be performed after clamping of the split mold blocks 19 is completed.

Figure 14:
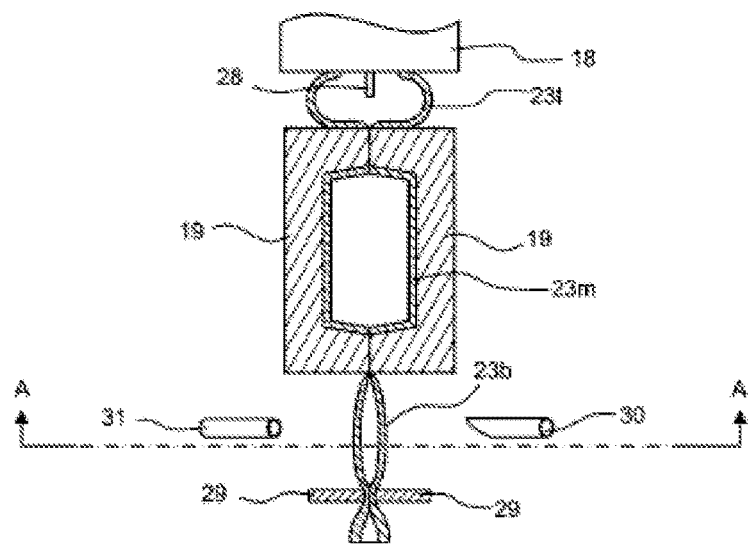
FIG. 14 is a vertical cross-sectional view passing through the center of the parison 23, showing a state after high-temperature air is discharged from the lower burr portion 23b.

The high-temperature air is contained in the balloon-like lower burr portion 23b. The air prevents the lower burr portion 23b from being cooled. Therefore, in the present embodiment, the opening 23b1 is formed in the lower burr portion 23b. The high-temperature air in the lower burr portion 23b is discharged through the opening 23b1. Thus, the cooling rate of the lower burr portion 23b is increased. When the air is discharged from the lower burr portion 23b, as shown in FIG. 14, the lower burr portion 23b has a deflated balloon-like shape. When the lower burr portion 23b is solidified as the balloon shape, a robot arm or the like hardly holds the lower burr portion 23b. However, when the lower burr portion 23b is solidified after having the deflated balloon-like shape, it is easy to grip the lower burr portion 23b with the robot arm or the like. Therefore, productivity is improved.

The opening 23b1 can be formed by piercing the opening forming member 30 into the lower burr portion 23b, or by cutting the lower burr portion 23b using the opening forming member 30 as shown in FIG. 13. When the lower burr portion 23b is pierced by the opening forming member 30, the opening 23b1 having substantially the same shape as an outer shape of the opening forming member 30 is formed. The opening 23b1 is formed before the lower burr portion 23b is cooled and solidified. Therefore, the opening 23b1 formed by the opening forming member 30 that pierces the lower burr portion 23b is easily blocked by the resin constituting the flowing lower burr portion 23b. On the other hand, as shown in FIG. 13, when the opening 23b1 is formed by cutting the lower burr portion 23b using the opening forming member 30, the opening 23b1 has a groove shape. Therefore, even if the resin constituting the lower burr portion 23b flows, the opening 23b1 is not easily blocked. Therefore, the opening 23b1 is preferably formed by cutting the lower burr portion 23b using the opening forming member 30.

In order to cut the lower burr portion 23b using the opening forming member 30, as shown in FIG. 10, the opening forming member 30 preferably has an elongated shape, and is disposed so that an angle α between the clamping direction (a direction of arrows A) of the split mold blocks 19 and the longitudinal direction of the opening forming member 30 is 20 to 70 degrees. Specifically, the angle α is, for example, 20, 30, 40, 50, 60 or 70 degrees. The angle α may be in a range between any two of the numerical values exemplified here.

Figure 15:
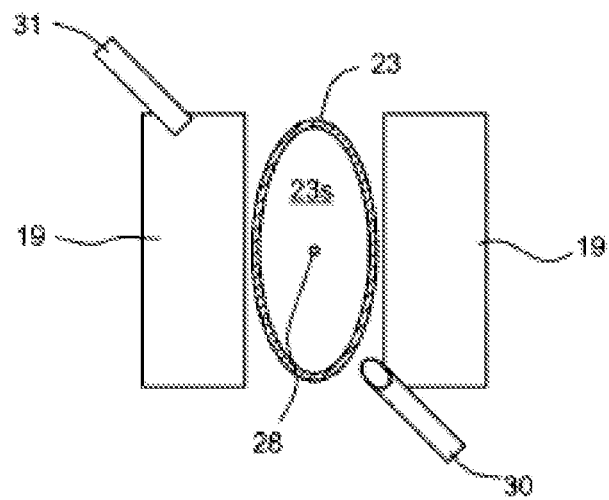
FIG. 15 is a view corresponding to FIG. 10(b), showing an arrangement example of the opening forming member 30 in a form in which the opening forming member 30 does not move.

When forming the opening 23b1, the opening forming member 30 preferably moves. This is because a groove-like opening 23b1 is easily formed by movement of the opening forming member 30. An angle between a moving direction (direction of an arrow B in FIG. 11) of the opening forming member 30 and the clamping direction (direction of arrows A in FIG. 10) of the split mold blocks 19 is preferably 0 to 45 degrees. This is because the groove-like opening 23b1 is easily formed in this case. Specifically, the angle is, for example, 0, 5, 10, 15, 20, 25, 30, 35, 40 or 45 degrees. The angle may be in a range between any two of the numerical values exemplified here. The arrows A and B are preferably parallel to one another. When forming the opening 23b1, the opening forming member 30 may not move. As shown in FIGS. 10 to 11, when the split mold blocks 19 are clamped, a lower portion of the parison 23 is expanded. Then, the lower burr portion 23b is formed. Therefore, for example, by arranging the opening forming member 30 in a position shown in FIG. 15, the opening forming member 30 does not contact the parison 23 before expansion. Further, when the parison 23 is expanded, the parison 23 is pressed against the opening forming member 30. Thus, the opening 23b1 can be formed.

A thickness of the opening forming member 30 is not particularly limited. When the opening forming member 30 is thin, a groove width of the groove-like opening 23b1 is narrow. The resin constituting the flowing lower burr portion 23b tends to block the opening 23b1. Therefore, a thickness T of the opening forming member 30 projected on a plane P (shown in FIG. 10) perpendicular to the clamping direction of the split mold blocks 19 is preferably 2 mm or more. The thickness T is, for example, 2 to 50 mm, specifically for example, 2, 3, 4, 5, 10, 15, 20, 25, 30, 35, 40, 45, or 50 mm. The thickness T may be in a range between any two of the numerical values exemplified here.

The opening forming member 30 preferably includes the pipe portion which is a pipe-like portion. In the present embodiment, the entire opening forming member 30 is the pipe portion. When the opening forming member 30 includes the pipe portion, the high-temperature air in the lower burr portion 23b can be discharged through an inside of the pipe portion. In addition, the high-temperature air in the lower burr portion 23b can also be sucked through the inside of the pipe portion by a suction device provided separately.

As shown in FIGS. 11 and 13, the opening forming member 30 preferably has a pointed tip portion 30a. In this case, as shown in FIG. 13(b), the tip portion 30a first contacts the lower burr portion 23b. This makes it easy to form the groove-like opening 23b1 by cutting the lower burr portion 23b. The tip portion 30a is preferably pointed so that the side close to the split mold blocks 19 projects. In this case, an opening 30b of the tip portion 30a faces downward. Therefore, it is possible to suppress the resin constituting the lower burr portion 23b from entering the opening forming member 30 through the opening 30b.

<Cooling Step>

In the cooling step, the cooling air is blown to the lower burr portion 23b. Thus, the lower burr portion 23b is cooled. The cooling air may be air having a temperature lower than that of the lower burr portion 23b. Normal temperature air can be used as the cooling air. The cooling air can be blown out from the air outlet 31. The cooling air may be blown while the opening 23b1 is being formed. However, the cooling air is preferably blown to the lower burr portion 23b after the opening 23b1 is formed. In this case, the lower burr portion 23b is pressed by the cooling air. Thus, the high-temperature air in the lower burr portion 23b can be discharged through the opening 23b1. The cooling air is preferably blown to the position facing the opening forming member 30 across the parison 23. In this case, the high-temperature air in the lower burr portion 23b can be discharged efficiently. The cooling step can be omitted if it is not necessary.

<Post Step>

In the post step, the molded article 23m having the upper burr portion 23t and the lower burr portion 23b attached thereto is taken out from the split mold blocks 19. The upper burr portion 23t and the lower burr portion 23b are removed from the molded article 23m. The lower burr portion 23b has a deflated shape. Therefore, the lower burr portion 23b is easy to handle. Similarly to the lower burr portion 23b, the air may be discharged from a formed opening of the upper burr portion 23t before the upper burr portion 23t is cooled and solidified. Further, the air in the balloon-like upper burr portion 23t may be sucked and removed from a blowing inlet of the pre-blowing nozzle 28. Furthermore, a configuration may be employed in which the cooling air is also blown to the upper burr portion 23*t*.

The present embodiment can also be implemented in the following modes.

Two or more opening forming members 30 may be provided. Further, a plurality of air outlets 31 for cooling may be provided.

The invention claimed is:

1. A resin for foam molding, comprising a component A, a component B and a component C, wherein
   the component A is a long-chain branched homopolypropylene,
   the component B is a long-chain branched block polypropylene,
   the component C is a polyethylene-based elastomer, and
   when a total of the components A to C is 100 parts by mass, content of the component A is 20 to 70 parts by mass, content of the component B is 20 to 70 parts by mass, and content of the component C is 1 to 20 parts by mass.

2. The resin according to claim 1, wherein when the total of the components A to C is 100 parts by mass, the content of the component A is 40 to 50 parts by mass, the content of the component B is 40 to 60 parts by mass, and the content of the component C is 5 to 10 parts by mass.

3. The resin according to claim 1, wherein
   the long-chain branched homopolypropylene is a peroxide-modified long-chain branched homopolypropylene, and
   the long-chain branched block polypropylene is a polymerized long-chain branched block polypropylene.

4. A method for producing a foam molded article, comprising a step of obtaining a foamed resin by melt-kneading the resin for foam molding according to claim 1 and a foaming agent in a foam extruder, forming a foamed parison by extruding the foamed resin from the foam extruder, and obtaining the foam molded article by molding the foamed parison.

5. A foam molded article formed by using the resin for foam molding according to claim 1, wherein ball drop fracture height when a 500 g ball is dropped at an environmental temperature of −10° C. is 40 cm or more.

* * * * *